United States Patent
Araki

(10) Patent No.: US 10,701,221 B2
(45) Date of Patent: Jun. 30, 2020

(54) INFORMATION INPUT APPARATUS, INFORMATION PROCESSING SYSTEM, AND INFORMATION PROCESSING METHOD

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/026,213

(22) Filed: Jul. 3, 2018

(65) Prior Publication Data

US 2019/0020770 A1 Jan. 17, 2019

(30) Foreign Application Priority Data

Jul. 11, 2017 (JP) .................. 2017-135822

(51) Int. Cl.
*G06F 3/12* (2006.01)
*H04N 1/00* (2006.01)
(Continued)

(52) U.S. Cl.
CPC ....... *H04N 1/00244* (2013.01); *G06F 3/1204* (2013.01); *G06F 3/14* (2013.01); *H04L 67/16* (2013.01); *H04N 1/00233* (2013.01); *H04N 1/00464* (2013.01); *H04N 1/00501* (2013.01); *H04N 1/00954* (2013.01); *H04N 1/64* (2013.01); *G06F 3/1224* (2013.01); *G06F 3/1236* (2013.01); *G06Q 10/1095* (2013.01); *H04N 1/32122* (2013.01); *H04N 2201/3212* (2013.01)

(58) Field of Classification Search
None
See application file for complete search history.

(56) References Cited

U.S. PATENT DOCUMENTS

2003/0164987 A1* 9/2003 Enomoto ........... H04N 1/00204
358/400
2007/0050226 A1 3/2007 Iga et al.
(Continued)

FOREIGN PATENT DOCUMENTS

EP 1 890 244 A2 2/2008
JP 2017-069697 4/2017

OTHER PUBLICATIONS

Extended European Search Report dated Nov. 20, 2018, in European Patent Application No. 18181142.3, 10 pages.

*Primary Examiner* — Huo Long Chen
(74) *Attorney, Agent, or Firm* — Oblon, McClelland, Maier & Neustadt, L.L.P.

(57) ABSTRACT

An information input apparatus is communicable via a network with an information processing apparatus that manages request information for requesting processing from an information storage service and an information display service. The information input apparatus includes circuitry configured to: generate data; acquire the request information from the information processing apparatus; request the information storage service to store the data, based on the request information; and request, based on the request information, registration of information regarding the data stored by the information storage service, for display of the information by the information display service.

12 Claims, 37 Drawing Sheets

(51) Int. Cl.
*G06F 3/14* (2006.01)
*H04N 1/64* (2006.01)
*H04L 29/08* (2006.01)
G06Q 10/10 (2012.01)
H04N 1/32 (2006.01)

(56) References Cited

U.S. PATENT DOCUMENTS

| | | | |
|---|---|---|---|
| 2009/0080029 A1* | 3/2009 | Vendrow | H04N 1/00212 358/402 |
| 2010/0238494 A1 | 9/2010 | Araki | |
| 2010/0318984 A1 | 12/2010 | Araki | |
| 2011/0051186 A1* | 3/2011 | Katsuda | H04N 1/00244 358/1.15 |
| 2011/0058205 A1 | 3/2011 | Araki | |
| 2012/0092447 A1* | 4/2012 | Jeong | H04L 51/08 348/36 |
| 2013/0063746 A1 | 3/2013 | Araki | |
| 2013/0125134 A1 | 5/2013 | Ota | |
| 2014/0204421 A1 | 7/2014 | Araki | |
| 2015/0082389 A1* | 3/2015 | Han | H04L 63/205 726/4 |
| 2016/0014283 A1* | 1/2016 | Nakano | H04N 1/00214 358/1.13 |
| 2017/0060496 A1 | 3/2017 | Shiraga et al. | |
| 2017/0085572 A1* | 3/2017 | Miyakawa | H04L 63/08 |
| 2018/0067700 A1 | 3/2018 | Araki | |

* cited by examiner

FIG. 14A

GET /storage/root/children

FIG. 14B

```
{
   "value": [
      {
         "id": "01VA6BAJUT3GIE55APSZHYVIH7N274MIA3",
         "name": "MATTER A",
         "webUrl": "https://storage.com/testuser/Hndkjaoilhe",
         "type" : "folder"
      },
      {
         "id": "01VA6BAJTEDPNWWUDR65C3FP5Y4KIEN2AD",
         "name": "MATTER B",
         "webUrl": "https://storage.com/testuser/HNKdiudSSFiuJ",
         "type" : "folder"
      },
      {
         "id": "01VA6BAJTEDPNWWUDR65C3FP5Y265MIFUT",
         "name": "MATTER B",
         "webUrl": "https://storage.com/testuser/HNKdiudSSFiuJ",
         "type" : "folder"
      }
   ]
}
```

FIG. 16A

GET /events?date=2017-06-12

FIG. 16B

```
{
    "value": [
      {
        "id": "aYXB7rPIPAAA=",
        "subject": "REVIEW OF FIGURE",
        "body": "Review figures for meeting on matter A",
        "start": {
           "dateTime": "2017-06-12T10:00:00"
        },
        "end": {
           "dateTime": "2017-06-12T11:00:00"
        }
      },
      {
        "id": "bLKB7rPIOAAA=",
        "subject": "MATTER A MEETING",
        "body": "MEETING WITH COMPANY A",
        "start": {
           "dateTime": "2017-06-12T13:00:00"
        },
        "end": {
           "dateTime": "2017-06-12T14:00:00"
        }
      },
      {
        "id": "cIMB1yAgRAAA=",
        "subject": "REGULAR MEETING",
        "body": "CHECK PROGRESS OF ALL MATTERS",
        "start": {
           "dateTime": "2017-06-12T15:00:00"
        },
        "end": {
           "dateTime": "2017-06-12T16:00:00"
        }
      }
    ]
}
```

FIG. 18A

```
CREATE /events
```

```
{
    "subject": "URGENT MEETING",
    "body": "",
    "start": {
        "dateTime": "2017-06-12T17:00:00"
    },
    "end": {
        "dateTime": "2017-06-12T19:00:00"
    }
}
```

FIG. 18B

```
{
    "id": "HAIoaddfnskjaosdf"
    "subject": "URGENT MEETING",
    "body": "",
    "start": {
        "dateTime": "2017-06-12T17:00:00"
    },
    "end": {
        "dateTime": "2017-06-12T19:00:00"
    }
}
```

PUT
/storage/items/01VA6BAJUT3GIE55APSZHYVIH7N274MIA3/
children/MATTER A_ REVIEW OF FIGURE_201706121000.pdf

+ SCAN FILE

{
  "name": "MATTER A_ REVIEW OF FIGURE_201706121000.pdf",
  "webUrl":"https://storage.com/testuser/KJPOIMmkdjosiH"
}

```
PATCH /events/aYXB7rPIPAAA=
```

```
{
    "body": "Review figures for meeting on matter A¥r¥n
        https://storage.com/testuser/KJPOIMmkdjosiH"
}
```

PATCH /events/aYXB7rPlPAAA=/attachments

{
　"referenceUrl": "https://storage.com/testuser/KJPOIMmkdjosiH"
}

INFORMATION INPUT APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-135822, filed on Jul. 11, 2017, in the Japan Patent Office, the entire disclosure of which is hereby incorporated by reference herein.

BACKGROUND

Technical Field

The present disclosure relates to an information input apparatus, an information processing system, and an information processing method.

Description of the Related Art

There are information processing systems that store data, such as image data generated by multifunction peripherals (MFPs), in external servers (storage servers). For example, in response to a user operation on a control panel (a control device), the MFP transmits image data acquired by scanning to a storage server so that the image data can be displayed on a personal computer (PC).

SUMMARY

According to an embodiment of this disclosure provides an information input apparatus communicable via a network with an information processing apparatus that manages request information for requesting processing from an information storage service and an information display service. The information input apparatus includes circuitry configured to: generate data; acquire the request information from the information processing apparatus; request the information storage service to store the data, based on the request information; and request, based on the request information, registration of information regarding the data stored by the information storage service, for display of the information by the information display service.

According another embodiment, an information processing system includes the above-described information processing apparatus, the information display service; and the information input apparatus communicable via a network with the information processing apparatus. The system includes circuitry configured to generate data; acquire the request information from the information processing apparatus; request the information storage service to store the data, based on the request information; and issue a request for display, by the information display service, of information regarding the data stored by the information storage service, based on the request information.

Yet another embodiment provides an information processing method performed by the information input apparatus described above. The method includes generating data; acquiring the request information from the information processing apparatus; requesting the information storage service to store the data based on the request information; and requesting, based on the request information, registration of information regarding the data stored by the information storage service, for display of the information by the information display service.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A and 14B illustrate information exchanged between the information input equipment and the information storage apparatus, according to an embodiment;

FIGS. 16A and 16B illustrate information exchanged between the information input equipment and the information management apparatus, according to an embodiment;

FIGS. 18A and 18B illustrate information exchanged between the information input equipment and the information management apparatus, according to an embodiment;

Figure 1:
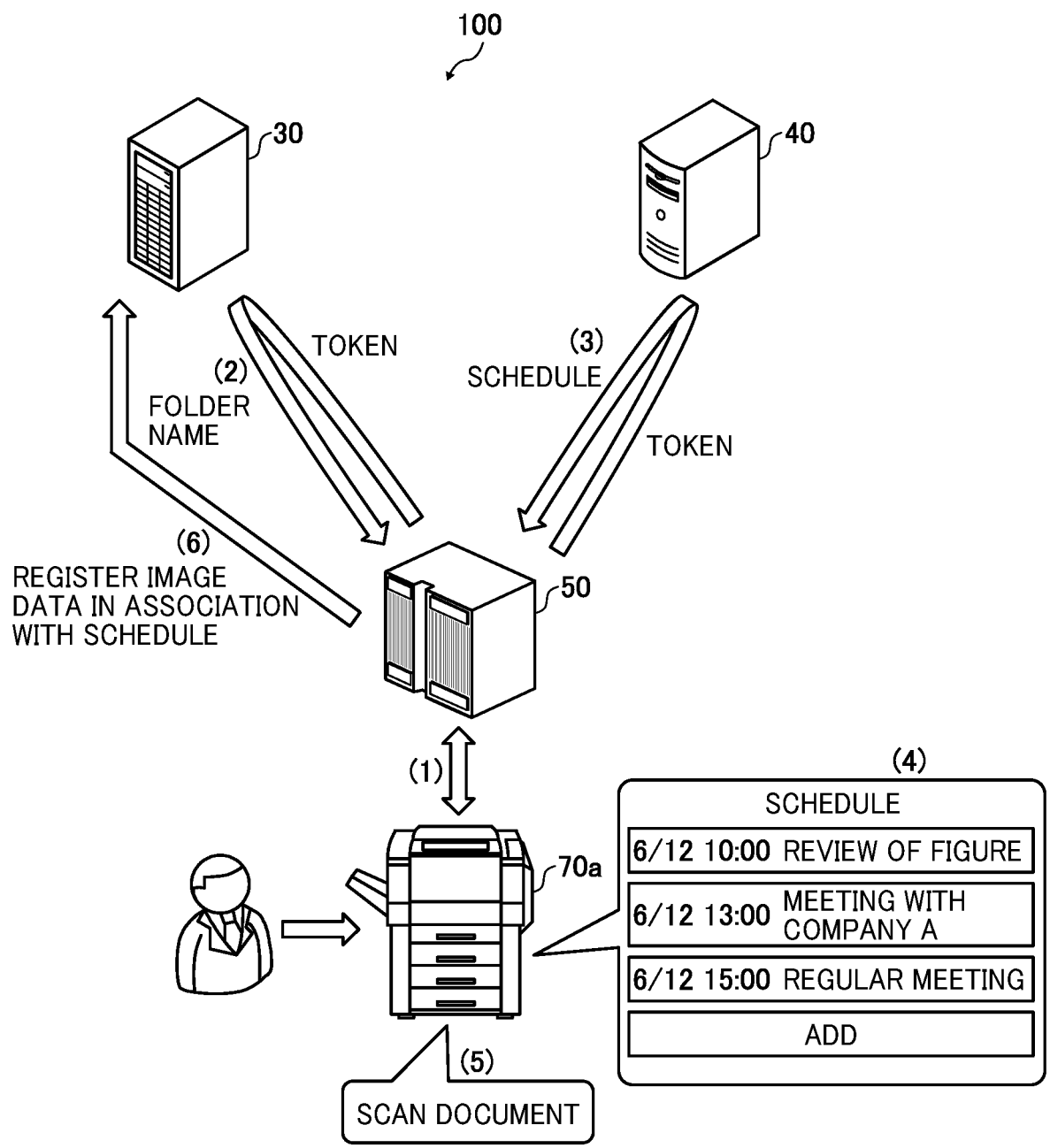
FIG. 1 is a schematic diagram illustrating general operation of an information processing system according to an embodiment of this disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an information input equipment, an information processing system, and an information processing method, performed by the information processing system according to embodiments of this disclosure are described. As used herein, the singular forms "a", "an", and "the" are intended to include the plural forms as well, unless the context clearly indicates otherwise.

Embodiment 1

Operation of Information Processing System

An information processing system according to the present embodiment registers image data generated by an MFP in an information storage apparatus, and the MFP registers the storage location information of the image data in association with a schedule managed by an information management apparatus. The storage location is used for a terminal device to display the image data. With this configuration, when a user operates the terminal device to display the schedule, the user can view the image data.

Figure 2:
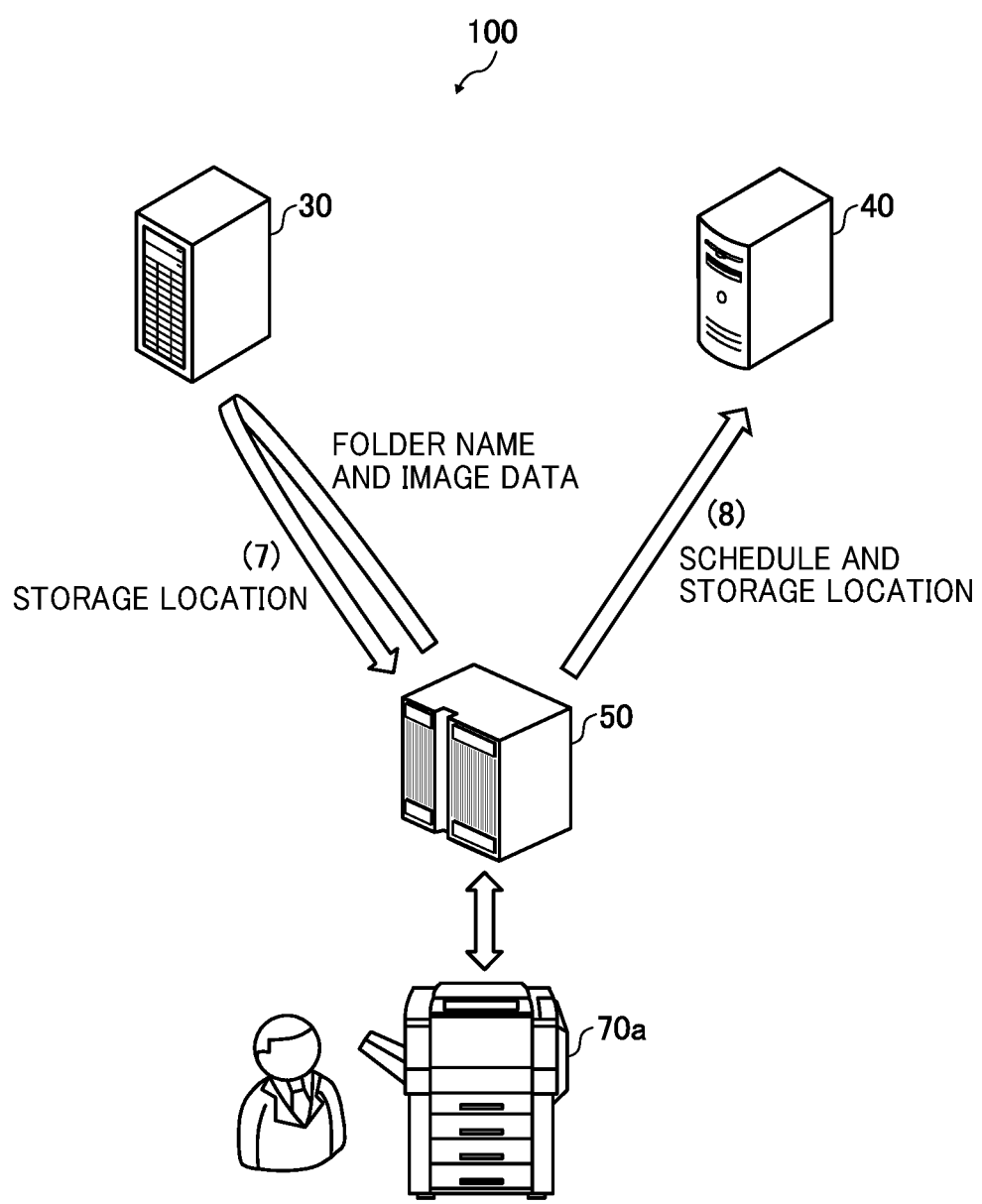
FIG. 2 is another schematic diagram illustrating general operation of an information processing system according to an embodiment.

FIGS. 1 and 2 illustrate a general operation of an information processing system 100 according to the present embodiment.

(1) Initially, a user operates an MFP 70a to sign in a storage service apparatus 50. Then, the user who has been registered in the storage service apparatus 50 is identified. The storage service apparatus 50 transmits a token to the MFP 70a. The token is information for the identified user to request an operation from an information storage apparatus 30 and an information management apparatus 40.

(2) The MFP 70a designates the token and acquires the name of a folder being a storage destination where the image data is stored, from the information storage apparatus 30 via the storage service apparatus 50.

(3) The MFP 70a designates the token and acquires a schedule from the information management apparatus 40 via the storage service apparatus 50.

(4) The MFP 70a displays a schedule (activity list), and the user selects an item (i.e., a calendar entry such as event, activity, or task, also collectively referred to as "event") with which the image data is associated, from the schedule. The user can operate the MFP 70*a* to add an item to the schedule via the storage service apparatus 50.

(5) The MFP 70*a* scans a document associated with the schedule item to generate the image data.

(6) The MFP 70*a* registers the image data together with the folder name selected by the user in the information storage apparatus 30 via the storage service apparatus 50.

(7) By contrast, the MFP 70*a* acquires the storage location information, which is, for example, a uniform resource locator (URL) indicating the address where the image data is stored.

(8) The MFP 70*a* registers the selected event and the storage location information in the information management apparatus 40 via the storage service apparatus 50. Specifically, the MFP 70*a* issues a request for display of the information regarding the image data, by the information management apparatus 40.

Thus, the information management apparatus 40 stores the schedule and storage location information of the image data associated with the schedule. Accordingly, when the user causes a terminal device 60 to display the schedule, the storage location of the image data is displayed. In response to clicking (or tapping) the storage location information by the user, the terminal device 60 acquires the image data from the information storage apparatus 30 and displays the image data. As described above, in the information processing system 100 according to the present embodiment, image data relating to a scheduled event is registered in association with the schedule. Accordingly, necessary work of a user, such as knowing the location where the image data is stored and inputting the storage location of the image data in the terminal device 60, can be reduced.

Terms in This Disclosure

The term "data" used in this disclosure is any data used for something or an object of some action. For example, the data is simply displayed or stored in a recording medium. The data in the embodiments described below is image data generated through scanning by the MFP 70*a*.

For example, the image data is generated by scanning of a document by an information input equipment 70 (e.g., the MFP 70*a*) or acquired externally from a memory (recording medium) or a server.

The storage location information is, for example, a URL or an internet protocol (IP) address of a resource of the information storage apparatus 30 in which the image data is stored. In one example, the storage location information is information used by the terminal device 60 to display the image data when communicating with the information management apparatus 40.

The term "service" represents some operation (e.g., storing, processing, and transferring) made on information (or operation using the information) via a network and also includes at least one information processing apparatus that provides the service.

The term "request information" represents information for the information input equipment 70 to request, for example, either the information storage apparatus 30 or the information management apparatus 40, to perform operation. Request information can include authority for communication, access privilege, and whether authentication has been made. In the present embodiment, a term "token" is equal to request information.

The term "enable the information management apparatus 40 to display the information" or "information can be displayed" represents the possibility (or capability) of displaying data and does not necessarily represent execution of displaying.

Example Configuration

Figure 3:
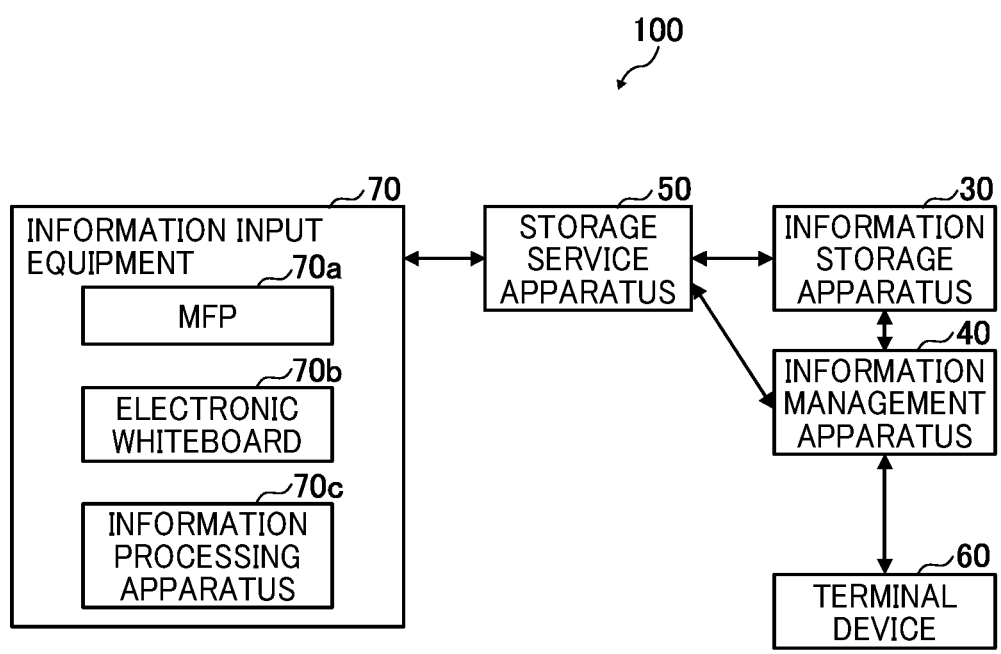
FIG. 3 is a schematic block diagram of an example structure of the information processing system illustrated in FIG. 1.

FIG. 3 is a schematic block diagram of an example structure of the information processing system 100. The information processing system 100 includes the information input equipment 70, the storage service apparatus 50, the information storage apparatus 30, the information management apparatus 40, and the terminal device 60. In FIG. 3, the information input equipment 70 is connected to the storage service apparatus 50 via a network, and the storage service apparatus 50, the information storage apparatus 30, and the information management apparatus 40 are connected to each other via a network. The terminal device 60 is connected to the information management apparatus 40 via a network. Such a configuration is a mere example for explaining the operation of the information processing system 100. The information processing system 100 have any configuration as long as the information input equipment 70, the storage service apparatus 50, the information storage apparatus 30, the information management apparatus 40, and the terminal device 60 can perform communication via a network as required.

The network to which the information input equipment 70, the storage service apparatus 50, the information storage apparatus 30, the information management apparatus 40, and the terminal device 60 connect can be, for example, a local area network (LAN) or the Internet.

The information input equipment 70 is used to generate image data input to the information processing system 100. Examples of the information input equipment 70 includes the MFP 70*a*, an electronic whiteboard 70*b*, and an information processing apparatus 70*c*. What necessary for the MFP 70*a* according to the present embodiment is a scanner function to optically read a document and generate image data. In this sense, the MFP 70*a* can be referred to as a scanner or document reading device. A typical MFP has a plurality of functions such as printing, scanning, and facsimile communication. An MFP (multifunction peripheral) may be referred to as an image forming apparatus, a multifunction printer, a copier, office equipment, or the like.

The electronic whiteboard 70*b* includes a large display with a touch panel. The electronic whiteboard 70*b* detects coordinates on a board indicated by a user and connects the coordinates to display a stroke. Additionally, the electronic whiteboard 70*b* has capabilities of displaying an image provided by, for example, a personal computer (PC) connected thereto and communicating with another electronic whiteboard 70*b* on a remote site to share the displayed stroke in a synchronous manner. An electronic whiteboard may be referred to as an electronic information board, etc.

The information processing apparatus 70*c* can be a computer including an imaging device, such as a camera, to capture surroundings thereof. Examples of the information processing apparatus 70*c* include a smartphone, a tablet terminal, a personal computer (PC), a cellar phone, a personal digital assistant (PDA), and a wearable PC such as smartglasses and a smartwatch. Additionally, the information processing apparatus 70*c* can be any device having imaging capability, such as a game machine and a car navigation system. The imaging device can be externally attached to the information processing apparatus 70*c*.

The storage service apparatus 50 is an information processing apparatus to relay communications among the information input equipment 70, the information storage apparatus 30, and the information management apparatus 40. The storage service apparatus 50 stores identification information, such as user identification (ID) and password, handled by the storage service apparatus 50, in association with tokens of the information storage apparatus 30 and the information management apparatus 40. The storage service apparatus 50 converts, as required, requests from the information input equipment 70 into information interpretable by the information storage apparatus 30 or the information management apparatus 40 according to a Web application interface (API) thereof. Then, the storage service apparatus 50 transmits the interpretable information to the information storage apparatus 30 or the information management apparatus 40. Additionally, the storage service apparatus 50 converts, as required, information from the information storage apparatus 30 and the information management apparatus 40 into information interpretable by the information input equipment 70 and transmits the interpretable information to the information input equipment 70. A Web API includes a procedure or a rule for calling a program via the Internet. Further, the storage service apparatus 50 performs operation relating to sign-in to the information processing system 100. With sign-in of once, the user gains access to the information storage apparatus 30 and the information management apparatus 40.

The information storage apparatus 30 is an information processing apparatus (an example of first information processing apparatus) that stores image data transmitted from outside and provides the image data in response to a request from outside. The data to be stored is not limited to image data but can be a variety of electronic data (an example of data used), such as data generated by various types of application software and text data. The information storage apparatus 30 can be referred to as a storage server, and the service provided by the information storage apparatus 30 can be referred to as storage service. Examples of the information storage apparatus 30 include, but not limited to, One Drive (registered trademark) and Google Drive (registered trademark).

The information management apparatus 40 (an example of second information processing apparatus) manages user information, which includes user attributes and information associated with user actions. The user-associated information includes information of user's schedules. The schedule includes time table, agenda, task list, and the like. Accordingly, the information management apparatus 40 stores information of event or activity to be done from a certain time to a certain time and information of task to be done by a certain time, for each user, and the user can check the information on the terminal device 60.

The terminal device 60 is an information processing apparatus operated by a user. The user operates the terminal device 60 to acquire, from the information management apparatus 40, the user's schedule information and displays the information on the terminal device 60. Since the user's schedule information includes the storage location information of the image data, the user can view this information without communicating with the information storage apparatus 30 from the terminal device 60. Naturally, the user can operate the terminal device 60 to directly acquire the image data from the information storage apparatus 30. An example of the terminal device 60 is similar to the information processing apparatus 70c of the information input equipment 70. However, the terminal device 60 does not require an imaging device such as a camera.

Hardware Configuration

Information Input Equipment

Figure 4:
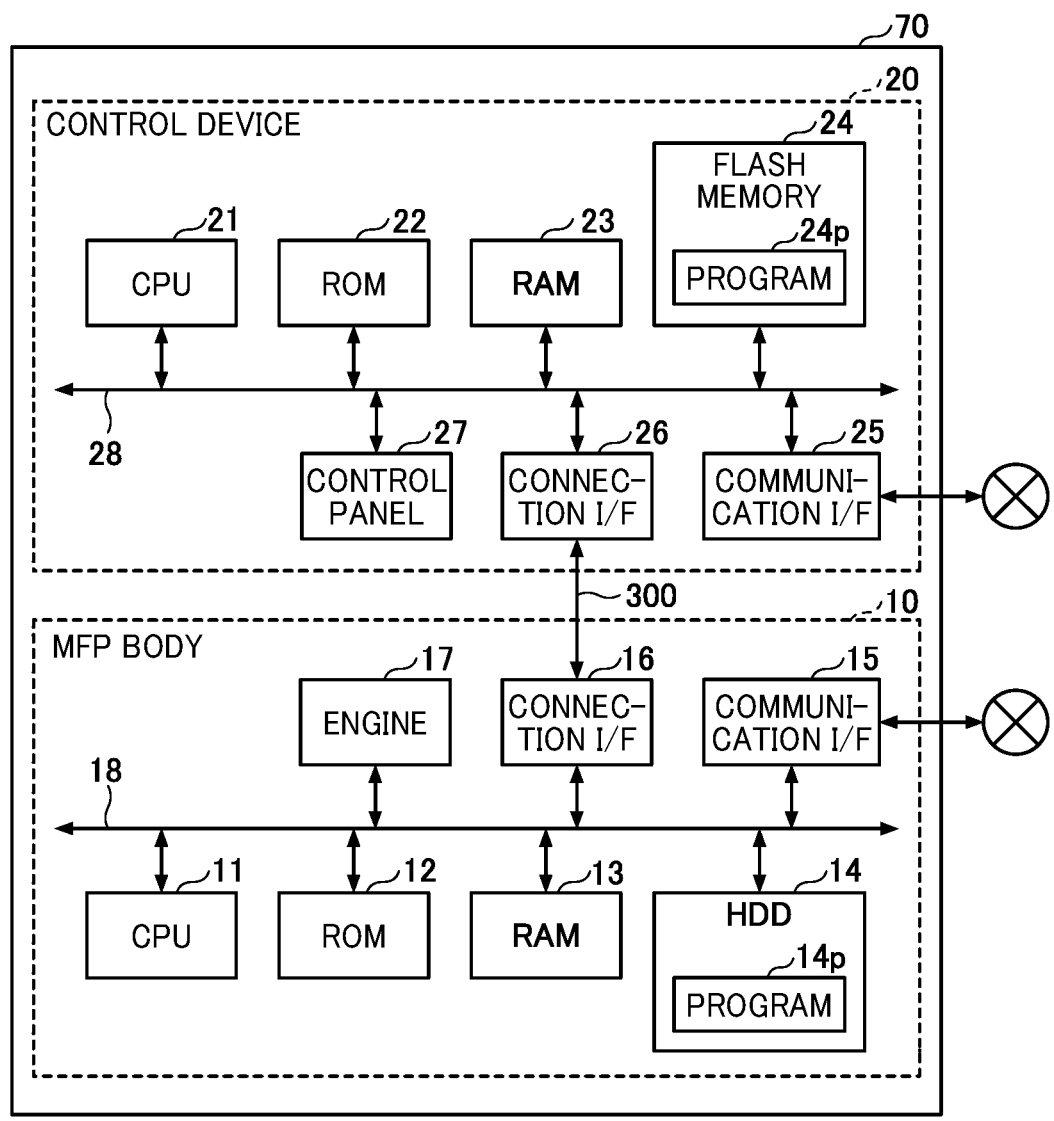
FIG. 4 is a schematic block diagram illustrating an example hardware configuration of a multifunction peripheral (MFP), as an example information input equipment of the information processing system illustrated in FIG. 3.

Referring to FIG. 4, descriptions are given below of a hardware configuration of the MFP 70a of the information input equipment 70. FIG. 4 is a schematic block diagram illustrating an example hardware configuration of the MFP 70a. As illustrated in FIG. 4, the MFP 70a includes an MFP body 10 and a control device 20 (or an operation unit). The MFP body 10 and the control device 20 are communicably connected to each other via a dedicated communication path 300. An example of the communication path 300 is a communication path in compliance with a universal serial bus (USB) standard. However, any standard, regardless of wired or wireless, can be used as the communication path 300.

The MFP body 10 operates in response to an operation accepted with the control device 20. The MFP body 10 has a function to communicate with an external apparatus such as a client personal computer (PC) and operate in response to an instruction received from the external apparatus.

A hardware configuration of the MFP body 10 is described below. As illustrated in FIG. 4, the MFP body 10 includes a central processing unit (CPU) 11, a read only memory (ROM) 12, a random access memory (RAM) 13, a hard disk drive (HDD) 14 storing a program 14$p$, a communication interface (I/F) 15, a connection I/F 16, and an engine 17, and these elements are connected with each other via a bus 18. FIG. 4 illustrates an example structure in which the MFP body 10 includes the HDD 14 for ease of explanation. However, the MFP body 10 can have a structure without the HDD 14 and without a sufficient memory capacity.

The CPU 11 controls entire operation of the MFP body 10. The CPU 11 controls the entire operation of the MFP body 10 by executing programs stored in the ROM 12 or the HDD 14, etc., using the RAM 13 as a work area, to implement various functions such as a copier function, a scanner function, a facsimile function, and a printer function as described above.

The communication I/F 15 is an interface for connecting the MFP body 10 with the network. The connection interface (I/F) 16 is an interface for enabling the MFP body 10 to communicate with the control device 20 via the communication path 300.

The engine 17 is hardware that performs processing for the copy function, the scanner function, the facsimile communication function, and the print function, except for general information processing and communication processing. The engine 17 includes, for example, a scanner (image reading unit) that scans and reads an image on a document, a plotter (image forming unit) that performs printing on sheets such as paper sheets, and a facsimile unit that performs facsimile communication. The engine 17 can further include optional equipment such as a finisher to sort printed sheets, and an automatic document feeder (ADF) for automatic document feeding.

A hardware configuration of the control device 20 is described below. As illustrated in FIG. 4, the control device 20 includes a CPU 21, a ROM 22, a RAM 23, a flash memory 24 to store a program 24$p$, a communication I/F 25, a connection I/F 26, and a control panel 27, which are connected with each another via a system bus 28. FIG. 4 illustrates an example structure in which the control device 20 includes the flash memory 24 for ease of explanation. However, the control device 20 can have a structure without the flash memory 24.

Note that the electronic whiteboard 70$b$ and the information processing apparatus 70$c$ can have any desirable configuration and have, at least, function of a general information processing apparatus.

Storage Service Apparatus

Figure 5:
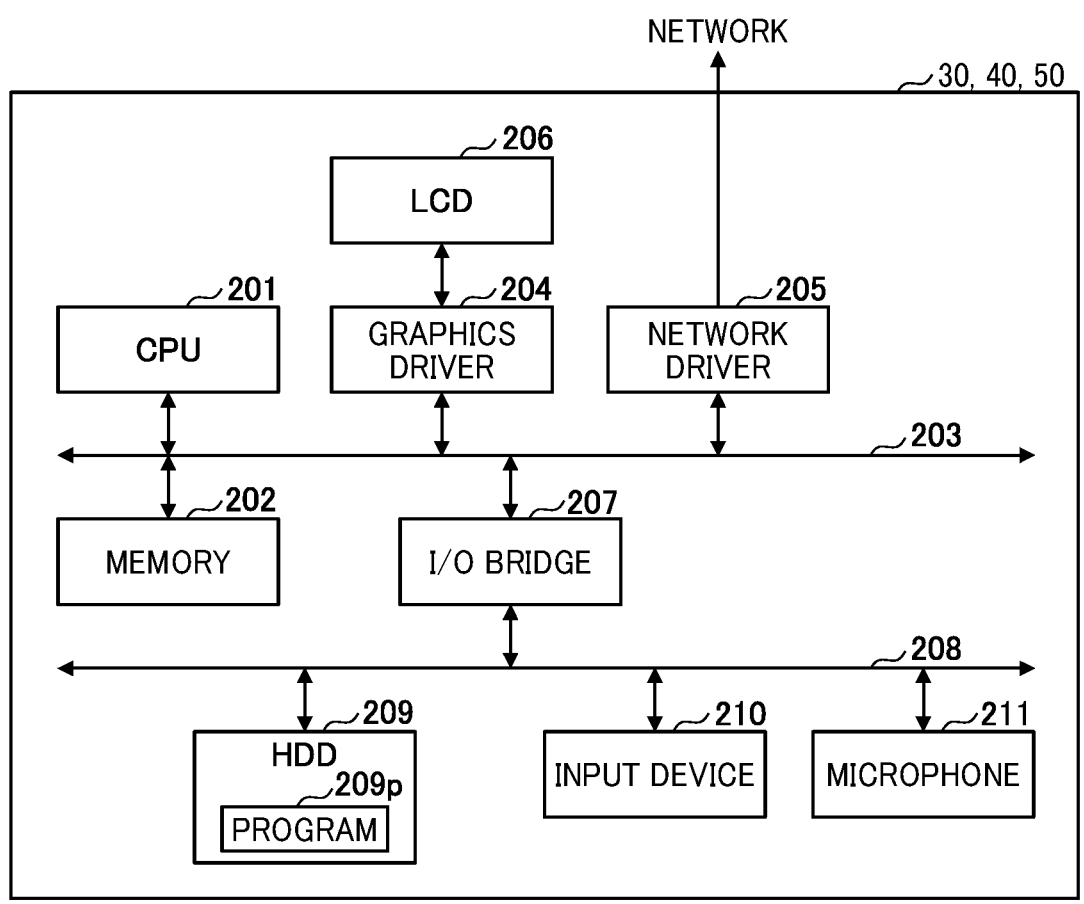
FIG. 5 is a schematic block diagram illustrating an example hardware configuration of a storage service apparatus according to an embodiment.

FIG. 5 is a schematic block diagram illustrating an example hardware configuration of the storage service apparatus 50. The storage service apparatus 50 includes a central processing unit (CPU) 201 and a memory 202 that enables high-speed access to data used by the CPU 201. The CPU 201 and the memory 202 are connected to other devices or drivers, such as, a graphics driver 204 and a network driver 205 (e.g., a driver for network interface card (NIC), of the storage service apparatus 50 via a system bus 203.

The graphics driver 204 is connected to a liquid crystal display (LCD) 206 as an example of display device via a bus. The graphics driver 204 monitors a processing result by the CPU 201. Further, the network driver 205 connects the storage service apparatus 50 to the network at a transport layer level and a physical layer level to establish a session with the information input equipment 70, the information storage apparatus 30, and the information management apparatus 40.

An input/output (I/O) bus bridge 207 is further connected to the system bus 203. On the downstream side of the I/O bus bridge 207, a memory device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), Universal Serial Bus (USB), etc. The HDD 209 stores a program 209p for controlling overall operations of the storage service apparatus 50. A solid state drive (SSD) can be used instead of the HDD 209. The program 209p can be distributed, as being stored in a recording medium. Alternatively, the program 209p can be distributed from a server for program distribution.

An input device 210 such as a keyboard and a mouse (called a pointing device) is connected to the I/O bus 208 via a bus such as a USB. The input device 210 accepts inputs or instructions by an operator such as a system administrator.

The storage service apparatus 50 can be implemented by cloud computing. The term "cloud computing" refers to computing where resources on a network are used or accessed without identifying specific hardware resources. Accordingly, the illustrated hardware configuration of the storage service apparatus 50 indicates hardware elements preferably included in the storage service apparatus 50. In addition, for the storage service apparatus 50 to support cloud computing, a physical configuration of the storage service apparatus 50 is not necessarily static. In other words, hardware resources can be dynamically connected and disconnected to constitute the storage service apparatus 50 depending on the load.

The information storage apparatus 30 and the information management apparatus 40 can have hardware configurations similar to that of the storage service apparatus 50. Even if the hardware configurations are different from that of the storage service apparatus 50, that does not matter in describing the information processing system 100 according to the present embodiment.

Functions

Figure 6:
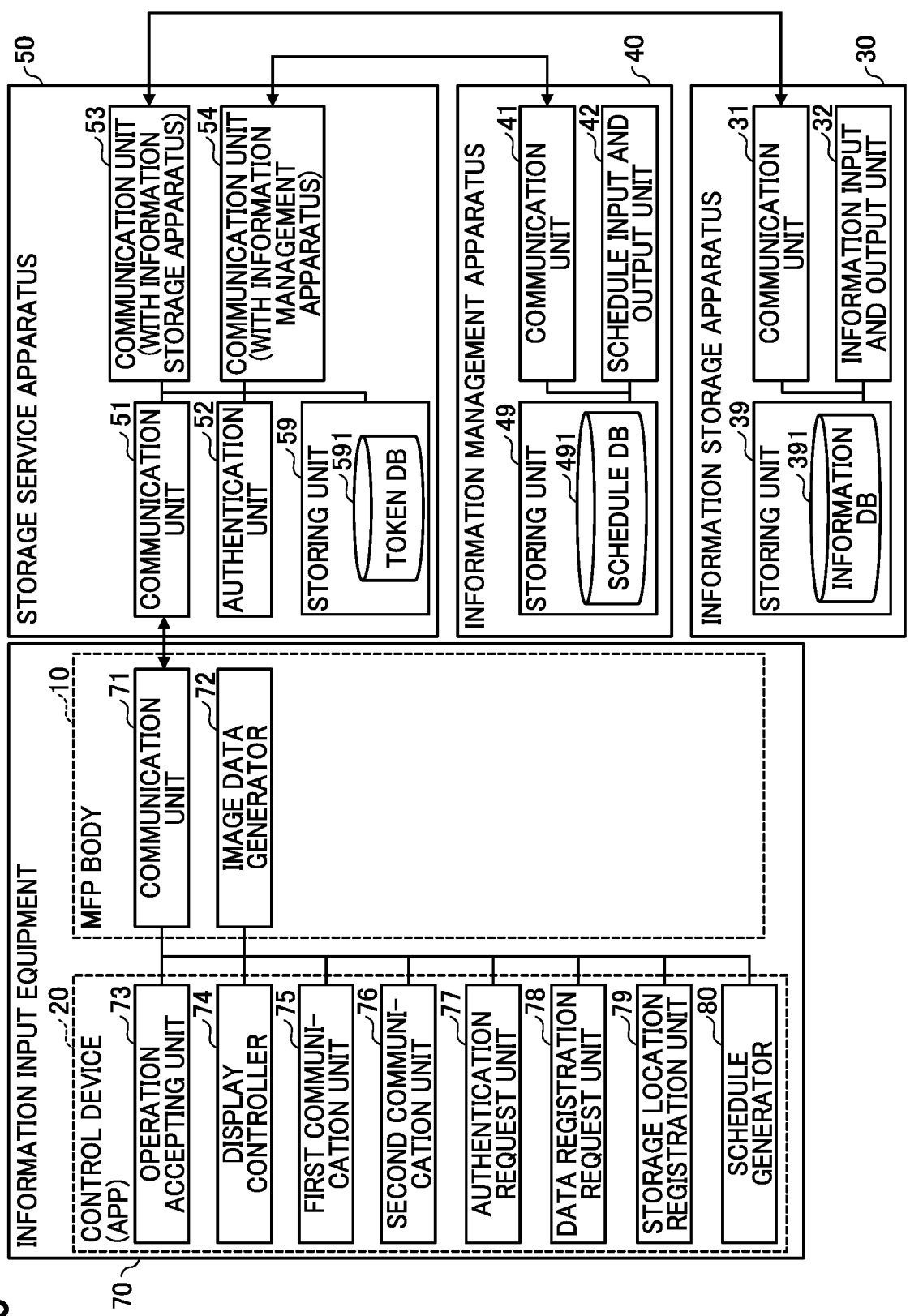
FIG. 6 is a functional block diagram of the information input equipment, the storage service apparatus, an information storage apparatus, and an information management apparatus of the information processing system illustrated in FIG. 3.

FIG. 6 is a functional block diagram of the information input equipment 70, the storage service apparatus 50, the information storage apparatus 30, and the information management apparatus 40 of the information processing system 100.

Information Input Equipment

The information input equipment 70 includes a communication unit 71, an image data generator 72, an operation accepting unit 73, a display controller 74, a first communication unit 75, a second communication unit 76, an authentication request unit 77, a data registration request unit 78, a storage location registration unit 79, and a schedule generator 80. Although the MFP 70a includes the MFP body 10 and the control device 20 in the hardware configuration of the information input equipment 70 (the MFP 70a) illustrated in FIG. 4, each function illustrated in FIG. 6 can be included in either of the MFP body 10 and the control device 20. As one example, the MFP body 10 includes the communication unit 71 and the image data generator 72, and the control device 20 includes the rest. In this case, each function is implemented by an application program that operates on the control device 20.

Each function of the information input equipment 70 is implemented by one or more of the components illustrated in FIG. 4 operating according to commands from the CPU 11 or 21 in accordance with the program 14p expanded from the HDD 14 into the RAM 13, or the program 24p expanded from the flash memory 24 into the RAM 23. These programs (or application programs) can be distributed from a server for program distribution, or, alternatively, can be distributed, in a state stored on a recording medium.

The communication unit 71 exchanges various types of data with the storage service apparatus 50 via the network. In the present embodiment, the communication unit 71 transmits authentication information for sign-in and image data and receives a folder name list and an activity list (i.e., schedule of specified date). The communication unit 71 is implemented, for example, by the program 14p executed by the CPU 11 illustrated in FIG. 4 to control the communication I/F 15. Hereinafter, a phrase "via the communication unit 71" may be omitted even when the communication unit 71 contributes to transmission or reception of information.

The image data generator 72 is configured to optically read a document and generate image data. In one example, the image data generator 72 merely acquires image data from outside, and, in another example, retrieves preliminarily stored image data. The image data generator 72 is implemented by the CPU 11 illustrated in FIG. 4 executing the program 14p to control the engine 17.

The operation accepting unit 73 accepts various kinds of inputs to the information input equipment 70 from a user. The operation accepting unit 73 is implemented, for example, by the CPU 21 illustrated in FIG. 4 executing the program 24p to control the control panel 27 and the like.

The display controller 74 displays various types of screens generated by an application program on the control panel 27. In the present embodiment, the display controller 74 displays the folder list of the information management apparatus 40 and the activity list (i.e., schedule of specified date) of the information management apparatus 40 on the control panel 27. The display controller 74 is implemented, for example, by the CPU 21 illustrated in FIG. 4 executing the program 24p to control the control panel 27 and the like.

The first communication unit 75 exchanges various types of information with the information storage apparatus 30 via the storage service apparatus 50. The communication between the first communication unit 75 and the information storage apparatus 30 can be either direct or via the communication unit 71 of the MFP body 10. The communication is not necessarily made via the storage service apparatus 50.

The second communication unit 76 exchanges various types of information with the information management apparatus 40 via the storage service apparatus 50. The communication between the second communication unit 76 and the information management apparatus 40 can be either direct or via the communication unit 71 of the MFP body 10. The communication is not necessarily made via the storage service apparatus 50.

The authentication request unit 77 transmits, to the storage service apparatus 50, authentication information (user ID and password) necessary for the user to signs in the system, together with an authentication request, thereby causing the user to sign in the information processing system 100. The authentication request unit 77 is implemented by the CPU 11 illustrated in FIG. 4 executing the program 24p.

The data registration request unit 78 requests the storage service apparatus 50 to register the image data generated by the image data generator 72. Thus, the storage service apparatus 50 registers the image data in the information storage apparatus 30. The data registration request unit 78 acquires storage location information, which is generated by the information storage apparatus 30 and transmitted by the storage service apparatus 50. The data registration request unit 78 is implemented by the CPU 11 illustrated in FIG. 4 executing the program 24p.

The storage location registration unit 79 requests the storage service apparatus 50 to register the storage location information acquired from the information storage apparatus 30. Thus, the storage service apparatus 50 registers the storage location information in the information management apparatus 40. The storage location registration unit 79 is implemented by the CPU 11 illustrated in FIG. 4 executing the program 24p.

The schedule generator 80 generates a schedule based on information about events or tasks input by a user. The schedule generator 80 does not have to generate a schedule item (e.g., event, activity, or tack), also referred to as "event", when the user selects one of scheduled events registered in the information management apparatus 40. The generated schedule item is transmitted via the storage service apparatus 50 to the information management apparatus 40. The schedule generator 80 is implemented by the CPU 11 illustrated in FIG. 4 executing the program 24p.

The storage service apparatus 50 is described below.

The storage service apparatus 50 includes a communication unit 51, an authentication unit 52, a communication unit 53 (for communication with the information storage apparatus 30), and a communication unit 54 (for communication with the information management apparatus 40). These function modules of the storage service apparatus 50 are implemented by an operation of one or more of the hardware components illustrated in FIG. 5 instructed by the CPU 301 according to the program expanded from the HDD 307 to the RAM 303.

The storage service apparatus 50 further includes a storing unit 59. The storing unit 59 is implemented by, for example, the memory 202 and the HDD 209 illustrated in FIG. 5. The storing unit 59 stores a token database (DB) 591.

Although each of the storage service apparatus 50, the information storage apparatus 30, and the information management apparatus 40 is described as one apparatus in the present embodiment, any of these can be divided into a plurality of apparatuses. For example, the storage service apparatus 50 is divided into an apparatus including the authentication unit 52 and another apparatus including the two communication units 53 and 54 respectively for communication with the information storage apparatus 30 and the information management apparatus 40. That is, any one of the storage service apparatus 50, the information storage apparatus 30, and the information management apparatus 40 may be implemented by any desired number of computers that may be distributed over a network to carry out any one of the above-described functions.

When an identical service provider provides the information storage apparatus 30 and the information management apparatus 40, these apparatuses can be combined into one apparatus.

TABLE 1

| User ID | Password | Token of Information Storage Apparatus | Token of Information Management Apparatus |
|---------|----------|----------------------------------------|-------------------------------------------|
| testuser | ******* | ABCDEFG | HIGKLMN |
| testuser2 | ****** | OPQRSTU | VXYZABCD |
| . | . | . | . |
| . | . | . | . |
| . | . | . | . |

Table 1 schematically illustrates token information stored in the token DB 591. The token DB 591 stores tokens for access to the information storage apparatus 30 and the information management apparatus 40. Specifically, items stored in the token DB 591 include "User ID", "Password", "Token of information storage apparatus", and "Token of Information Management Apparatus". As illustrated in Table 1, for each user, tokens of the information storage apparatus 30 and the information management apparatus 40 are registered. With this configuration, as the user signs in the storage service apparatus 50, the user gains access to the information storage apparatus 30 and the information management apparatus 40. The user ID is information for identifying a user. The term "ID" is an abbreviation of identification and means an identifier or identification information. ID is represented by either one or a combination of a name, a code, a character string, and a numeral value and used for uniquely distinguishing one target from a plurality of targets. The same applies to other IDs than the user ID. The term "password" represents information known only to (or concealed by) the user and used for authenticating the user. The term "token" means a sign or proof in principle, but on the network, a token is used in the sense of authenticity, access privilege, watchword, or evidence. In other words, the token of the information storage apparatus 30 is information to confirm the identity of the user using the information storage apparatus 30, and the token of the information management apparatus 40 is information to confirm the identity of the user using the information management apparatus 40.

Functions of the storage service apparatus 50 are described. The communication unit 51 transmits and receives various kinds of information to and from the information input equipment 70. In the present embodiment, the communication unit 51 receives the authentication information and the image data from the information input equipment 70 and transmits the folder name list, the activity list (i.e., schedule), and the storage location information thereto. The communication unit 51 is implemented by the CPU 201 illustrated in FIG. 5 executing the program 209p to control the network driver 205.

The authentication unit 52 refers to the token DB 591 in response to an authentication request from the information input equipment 70 and determines whether authentication succeeds. When the authentication succeeds, the authentication unit 52 permits the communication unit 53 to communicate with the information storage apparatus 30 using the token of the information storage apparatus 30 and further permits the communication unit 54 to communicate with the information management apparatus 40 using the token of the information management apparatus 40. The authentication unit 52 causes an external authentication apparatus to preliminarily authenticate the user by an authentication method such as OAuth (an open authentication standard). Then, the authentication unit 52 acquires tokens that are acquired, from the authentication apparatus, by the information storage apparatus 30 and the information management apparatus 40 cooperating in authentication with the authentication apparatus, and stores the tokens in the token DB 591. This configuration enables the storage service apparatus 50 to communicate with the information storage apparatus 30 and the information management apparatus 40 with the tokens. The authentication unit 52 is implemented by the CPU 201 illustrated in FIG. 5 executing the program 209p.

The communication unit 53 exchanges various types of information with the information storage apparatus 30 using the token of the information storage apparatus 30. In the present embodiment, the communication unit 53 receives the folder list and the storage location information therefrom and transmits the image data thereto. The communication unit 53 is implemented by the CPU 201 illustrated in FIG. 5 executing the program 209p to control the network driver 205.

The communication unit 54 exchanges various types of information with the information management apparatus 40 using the token of the information management apparatus 40. In the present embodiment, the communication unit 54 receives the activity list (i.e., schedule) therefrom and transmits the image data and the storage location information thereto. The communication unit 54 is implemented by the CPU 201 illustrated in FIG. 5 executing the program 209p to control the network driver 205.

Information Storage Apparatus

The information storage apparatus 30 includes a communication unit 31 and an information input and output (I/O) unit 32. Each function module of the information storage apparatus 30 is implemented by an operation of one or more of the hardware components illustrated in FIG. 5, instructed by the CPU 301 according to the program expanded from the HDD 307 to the RAM 303.

The information storage apparatus 30 includes a storing unit 39. The storing unit 39 is implemented by, for example, the memory 202 and the HDD 209 illustrated in FIG. 5. The storing unit 39 includes an information DB 391.

Table 2 schematically illustrates information stored in the information DB 391. The information DB 391 is for managing the information stored in the information storage apparatus 30 for each user. Items of the information DB 391 includes "Token of information Storage Apparatus", "User ID of Information Storage Apparatus", "Name", "Folder ID", and Web URL. The item "Name" represents a folder name. "Folder ID" is information for specifying or identifying a folder in the information storage apparatus 30. "Web URL" is an URL of the folder and serves as storage location information.

Functions of the information storage apparatus 30 are described. The communication unit 31 exchanges various types of information with the storage service apparatus 50. In the present embodiment, the communication unit 31 transmits the folder list and the storage location information to the storage service apparatus 50 and receives image data therefrom. The communication unit 31 is implemented by the CPU 201 illustrated in FIG. 5 executing the program 209p to control the network driver 205.

The information I/O unit 32 writes information in the storing unit 39 and retrieves information therefrom. The information I/O unit 32 is implemented by the CPU 201 illustrated in FIG. 5 executing the program 209p.

Information Management Apparatus

The information management apparatus 40 includes a communication unit 41 and a schedule I/O unit 42. Each function module of the information management apparatus 40 is implemented by an operation of one or more of the hardware components illustrated in FIG. 5, instructed by the CPU 301 according to the program expanded from the HDD 307 to the RAM 303.

The information management apparatus 40 further includes a storing unit 49. The storing unit 49 is implemented, for example, by the memory 202 and the HDD 209 illustrated in FIG. 5. The storing unit 49 includes a schedule DB 491.

TABLE 2

| Token of Information Storage Apparatus | User Id of Information Storage Apparatus | Name | Folder ID | Web URL |
|---|---|---|---|---|
| ABCDEFG | testuser | Matter A | 01VA6BAJUT3GIE55APSZHYVIH7N274MIA3 | https://storage.com/testuser/Hndkjaoilhe |
| | | Matter B | 01VA6BAJTEDPNWWUDR65C3FP5Y4KIEN2AD | https://storage.com/testuser/HnifofDDeui |
| | | Matter C | 01VA6BAJTEDPNWWUDR65C3FP5Y265MIFUT | https://storage.com/testuser/HNKdiudSSFiuJ |

TABLE 3

| User ID of Information Management Apparatus | Subject | Schedule ID | Body | Start | End |
|---|---|---|---|---|---|
| testuser | Review of Figure | aYXB7rPIPAAA | Review figures for meeting on matter A. | 2017-06-12 T 10:00:00 | 2017-06-12 T 11:00:00 |
| | Matter A Meeting | bLKB7rPIOAAA | MEETING WITH COMPANY A | 2017-06-12 T13:00:00 | 2017-06-12 T14:00:00 |
| | Regular Meeting | cIMB1yAgRAAA | CHECK PROGRESS OF ALL MATTERS | 2017-06-12 T15:00:00 | 2017-06-12 T16:00:00 |

Table 3 schematically illustrates information stored in the schedule DB 491. The information management apparatus 40 uses the schedule DB 491 to manage, for each user, the information managed thereby. Items of the schedule DB 491 include "Token of Information Management Apparatus", "User ID of Information Management Apparatus", "Subject", "Schedule ID", "Body", "Start" (start data and time), and "End" (end date and time). The item "Subject" represents the title of a schedule item. The item "Schedule ID" is information for specifying or identifying a schedule item in the information management apparatus 40. The item "Body" is optional information about the schedule and user is allowed to freely input such information. The item "Start" represents start time of the schedule item and "End" represents end time of the schedule item.

As can be known from Tables 2 and 3, although the user ID of the information storage apparatus 30 differs from the user ID of the information management apparatus 40 in the present embodiment, the user ID of the information storage apparatus 30 is identical to that of the information management apparatus 40 in some cases when the information storage apparatus 30 and the information management apparatus 40 are managed by an identical provider. Needless to say, different user IDs can be used for these apparatuses as in the present embodiment. In this case, these apparatuses may be managed by different parties.

Functions of the information management apparatus 40 are described. The communication unit 41 exchanges various types of information with the storage service apparatus 50. In the present embodiment, the communication unit 41 transmits the schedule (activity list) to the storage service apparatus 50 and receives the storage location information of the image data from the storage service apparatus 50. The communication unit 41 is implemented by the CPU 201 illustrated in FIG. 5 executing the program 20p to control the network driver 205.

The schedule I/O unit 42 writes a schedule item in and retrieves a schedule item from the storing unit 49. The schedule I/O unit 42 is implemented by the CPU 201 illustrated in FIG. 5 executing the program 209p.

Figure 7:
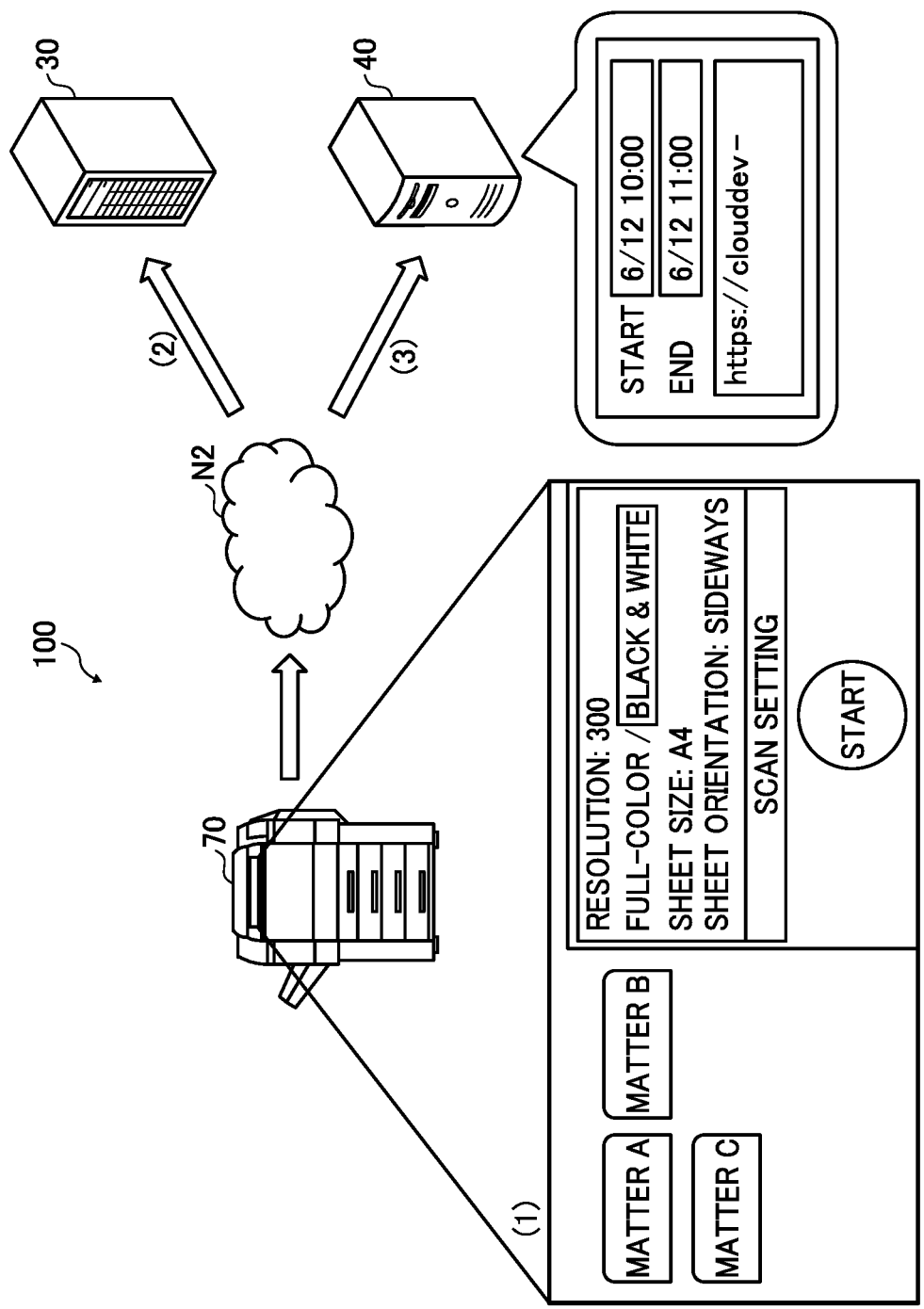
FIG. 7 is a schematic diagram illustrating operation of the information processing system, according to an embodiment.

FIG. 7 is a schematic diagram illustrating operation of the information processing system 100. (1) A user selects, on the information input equipment 70, a folder acquired from the information storage apparatus 30 and selects, on the information input equipment 70, a schedule item acquired from the information management apparatus 40. At that time, the user can input a file name of the image data. The folder name is information representing the location where the image data is stored. (2) The information input equipment 70 transmits the image data generated by scanning, to the information storage apparatus 30. The information input equipment 70 acquires the storage location information of the image data from the information storage apparatus 30. (3) The information input equipment 70 transmits the schedule item and the storage location information to the information management apparatus 40. Then, the information management apparatus 40 registers the storage location information in association with the schedule. Accordingly, as the user communicates with the information management apparatus 40 to display the schedule from the terminal device 60, the storage location information is displayed together. Then, the user obtains the image data associated with the schedule from the information storage apparatus 30 and views the image data.

Example Screen on Information Storage Apparatus

Figure 8:
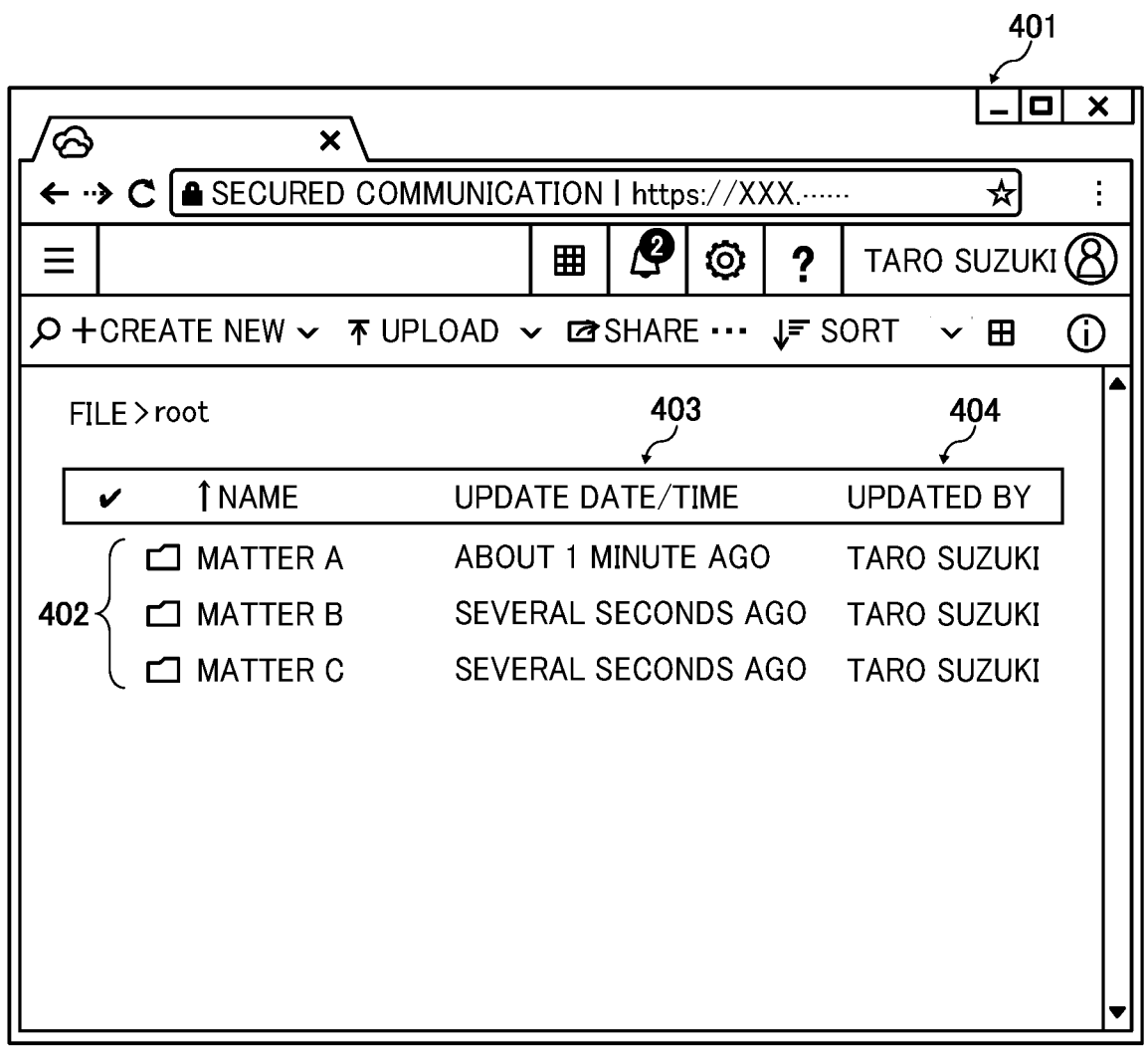
FIG. 8 illustrates an example folder screen on a terminal device communicating with the information storage apparatus, according to an embodiment.

FIG. 8 illustrates an example of a folder screen 401 on the terminal device 60 communicating with the information storage apparatus 30. The information storage apparatus 30 has a capability of a web server and transmits screen data described in hypertext markup language (HTML), script written in a computer language, or the like to the terminal device 60. The terminal device 60 analyzes the screen data and provides visual presentation as illustrated in FIG. 8. In this embodiment, the phase in which the terminal device 60 directly communicates with the information storage apparatus 30 is not described. Note that FIG. 8 is a diagram for explaining the information stored or provided by the information storage apparatus 30. As a user signs in to the information storage apparatus 30, the user is identified. The information storage apparatus 30 retrieves information, such folder information, associated with the user, from the information DB 391 in Table 2 and transmits the information, as screen data, to the terminal device 60.

The folder screen 401 includes display fields such as a folder name field 402, an update date/time field 403, and an updated by field 404. In the folder name field 402, the value of the item "Name" in Table 2 is indicated. In the update date/time field 403 and the updated by field 404, the date and time of last update of the information in the folder and the person who updated the information are respectively indicated. The information indicated in these fields are managed by the information storage apparatus 30.

As the user clicks (or presses) the folder name field 402, the terminal device 60 accepts the operation and requests the information storage apparatus 30 to retrieve a file in the folder. The information I/O unit 32 of the information storage apparatus 30 transmits the file (for example, image data), specified by the web URL associated with the folder name, to the terminal device 60.

Thus, the user can view the image data from the terminal device 60. However, in some cases, information management is troublesome and users are required to grasp the folder in which the image data is stored.

Example Screen on Information Storage Apparatus

Figure 9:
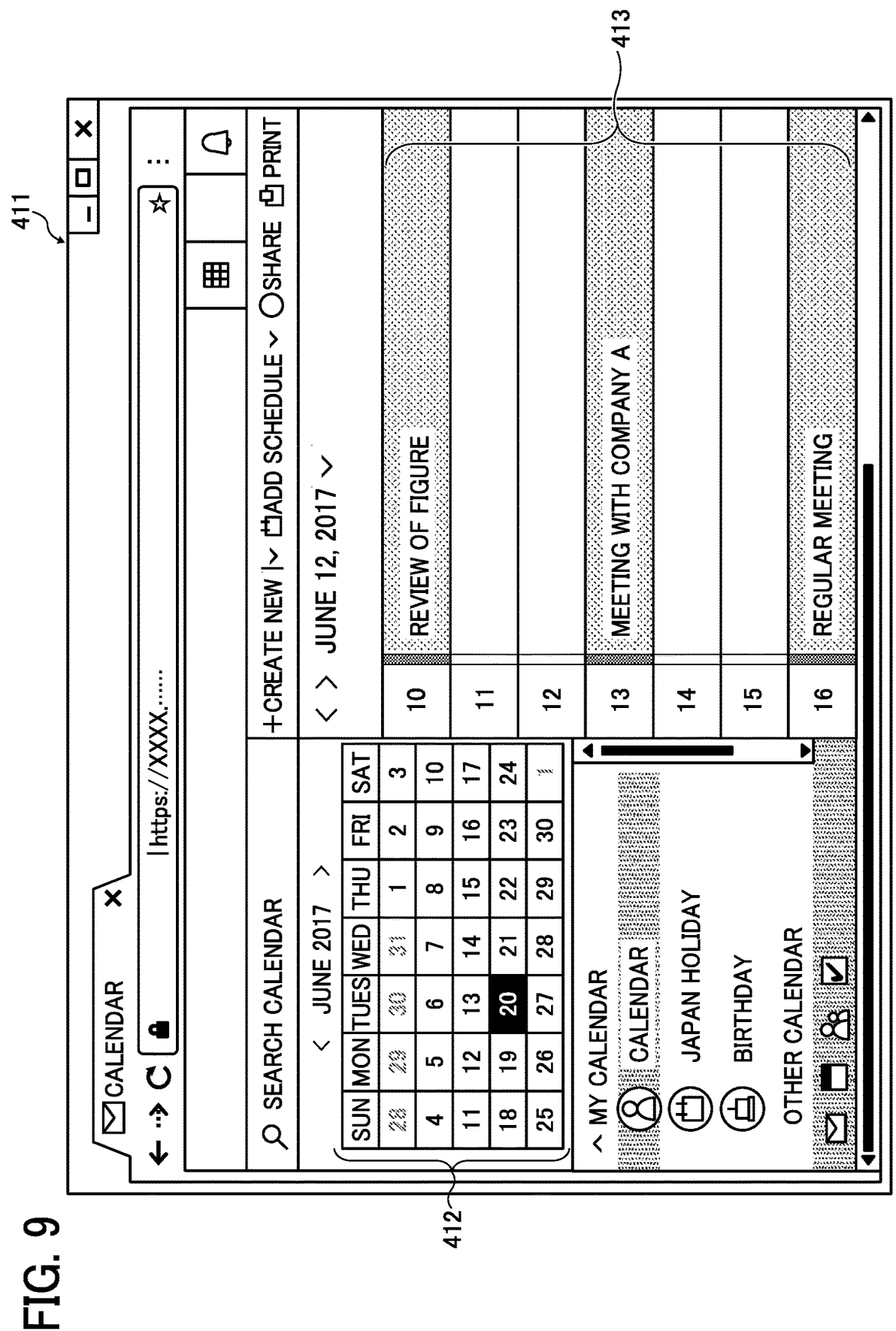
FIG. 9 illustrates a schedule screen on the terminal device communicating with the information management apparatus, according to an embodiment.

FIG. 9 illustrates a schedule screen 411 (i.e., calendar screen) on the terminal device 60 communicating with the information management apparatus 40. The information management apparatus 40 has a capability of a web server and transmits screen data described in hypertext markup language (HTML), script written in a computer language, or the like to the terminal device 60. The terminal device 60 analyzes the screen data and provides visual presentation as illustrated in FIG. 9. As a user signs in to the information management apparatus 40, the user is identified. The information management apparatus 40 reads out, as a schedule associated with the user, information item such as "Subject" from the schedule DB 491 in Table 3 and transmits the information, as screen data, to the terminal device 60. FIG. 9 illustrates a schedule of current date.

The schedule screen 411 includes a calendar field 412 and a schedule field 413. In the schedule field 413, the values (event titles) of the subjects in Table 3 are presented in association with the start time and end time.

As the user clicks (or taps) the event title, the terminal device 60 accepts the operation and requests details of the selected event from the information management apparatus 40. As a result, the schedule detail screen 421 illustrated in FIG. 9 is presented. The schedule I/O unit 42 of the information management apparatus 40 acquires information items such as "Body", "Start", "End", and the like from the schedule DB 491 and transmits the information, as screen data, to the terminal device 60.

Figure 10:
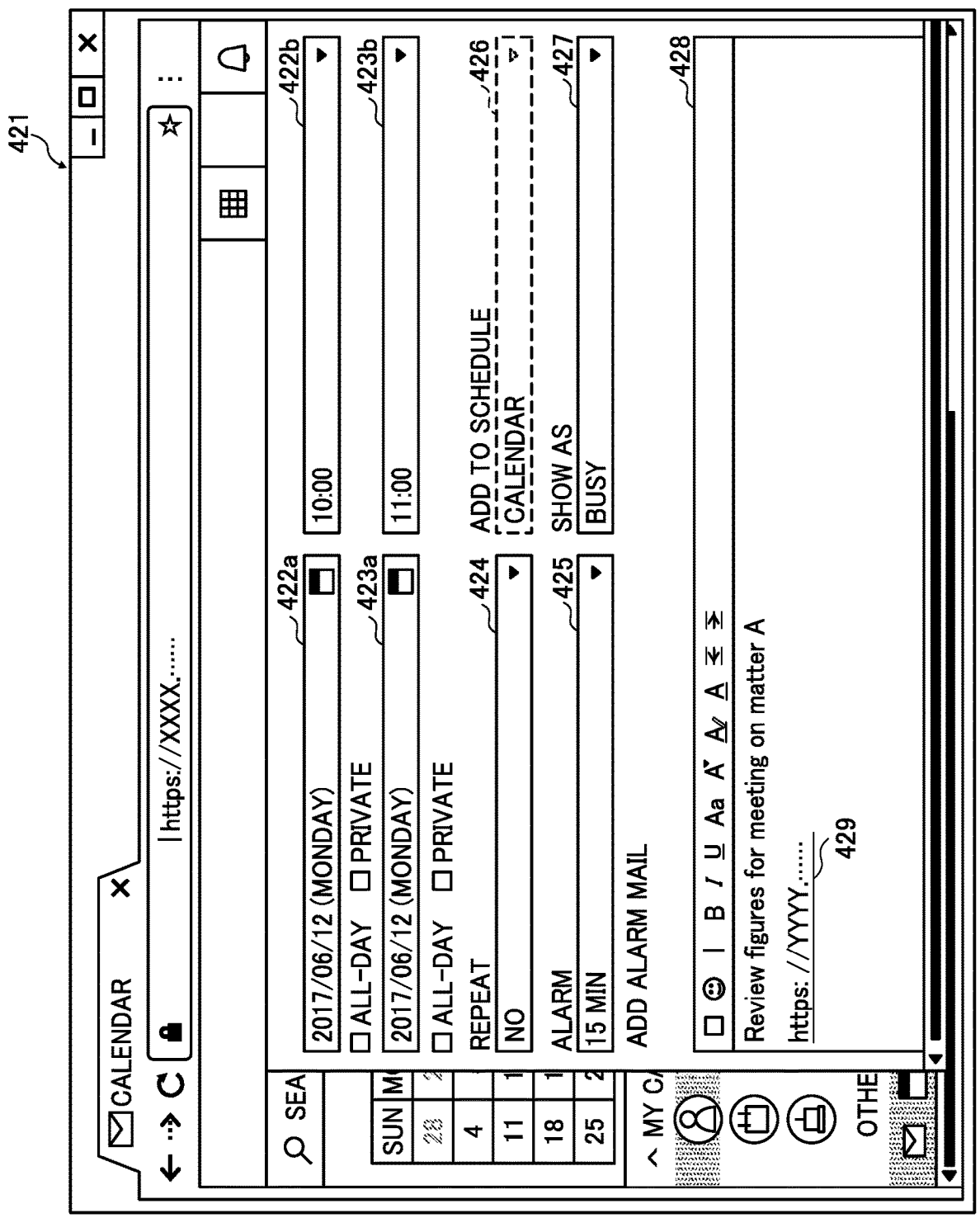
FIG. 10 illustrated an example schedule detail screen on the terminal device, according to an embodiment.

FIG. 10 illustrates an example of the schedule detail screen 421 displayed on the terminal device 60. The schedule detail screen 421 includes a start date field 422a, a start time field 422b, an end date field 423a, an end time field 423b, a recurrence setting field 424, an alarm field 425, an add to schedule field 426, an availability indication field 427, and a body field 428. The start date field 422a, the start time field 422b, the end date field 423a, and the end time field 423b are information included in the information items "Start" and "End" in the schedule DB 491. In the recurrence setting field 424, whether or not the event is repeated with frequency, e.g., daily, weekly, and monthly, is set. In the alarm field 425, the user can set the timing of output of a reminder alarm (email, etc.) in minutes to the start of event. In the add to schedule field 426, whether to save the schedule item in the calendar is set. In the availability indication field 427, how the schedule item is presented to public is set. The content of "Body" in the schedule DB 491 is presented in the body field 428.

The storage location information 429 is presented in the body field 428. As the user clicks (or presses) the storage location information 429, the image data associated with this schedule item is retrieved from the schedule detail screen 421 and presented on the terminal device 60.

Screen Transition

Figure 11:
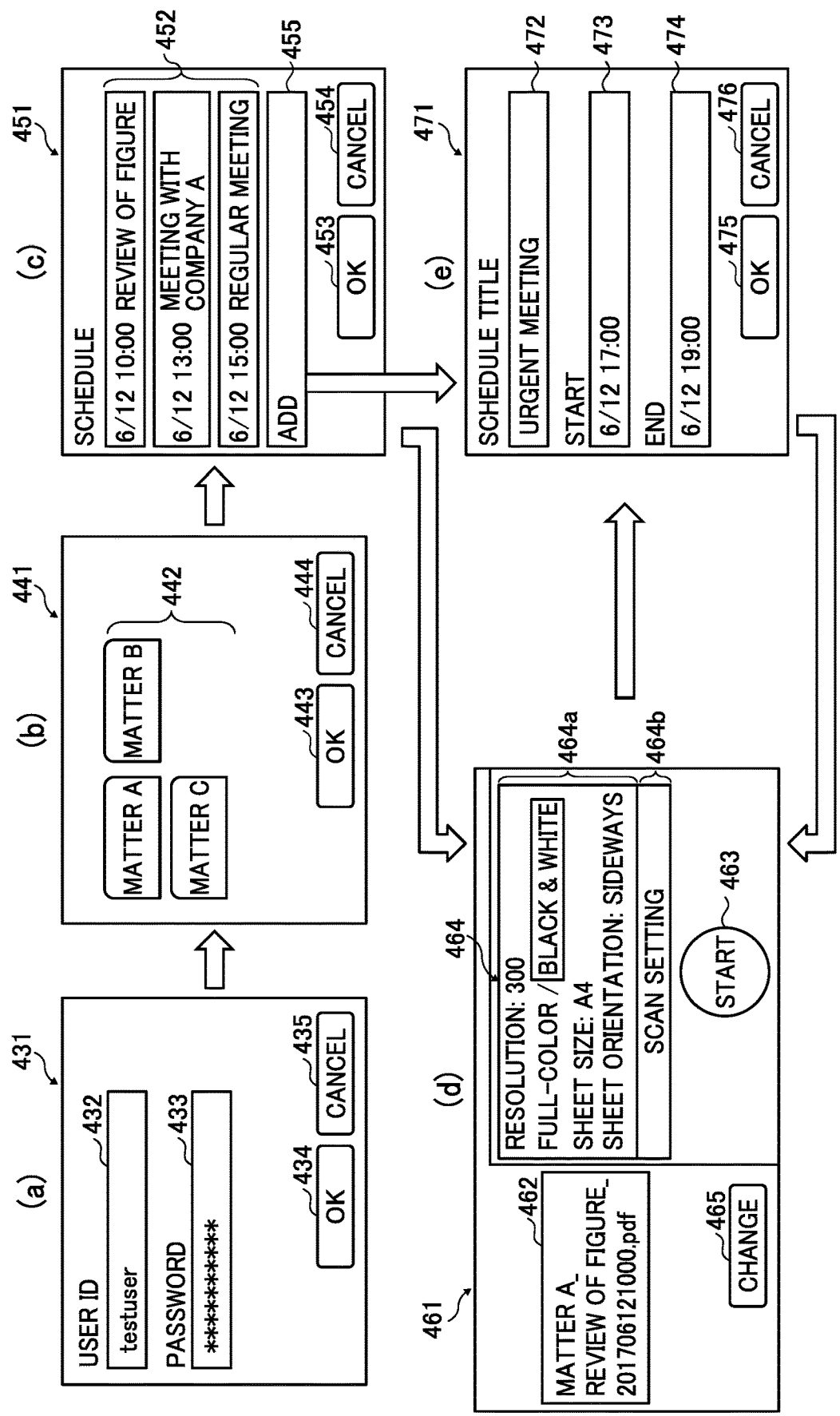
FIG. 11 illustrates an example of screen transition on the MFP as one example of the information input equipment according to an embodiment.

Referring to FIG. 11, descriptions are given of an example of screen transition on the information input equipment 70. FIG. 11 illustrates an example of screen transition on the MFP 70a as the information input equipment 70.

An example sign-in screen 431 is presented in (a) in FIG. 11. When the user scans the document with the MFP 70a and registers the image data in the information storage apparatus 30, the user operates the MFP 70a to display the sign-in screen 431. The sign-in screen 431 is for the user to sign in the information processing system 100. The sign-in screen 431 includes a user ID field 432, a password field 433, an OK button 434, and a cancel button 435. The user inputs the user ID (presented in the token DB 591 in Table 1) in the user ID field 432 and inputs the password in the password field 433. It is assumed that the user presses the OK button 434, and authentication of the user is succeeded.

An example folder list screen 441 is presented in (b) in FIG. 11. When the authentication of the user is successful, the folder list screen 441 is displayed. On the folder list screen 441, a list of folders preliminarily created by the user in the information storage apparatus 30 is displayed. The folder list screen 441 includes one or more folder names 442, an OK button 443, and a cancel button 444. The user can also operate the MFP 70a to create a new folder in the information storage apparatus 30. The information storage apparatus 30 can create a default folder name (for example, "new folder") and transmit the default folder name to the information input equipment 70. As the user presses one of the folder names 442 to store the image data and presses the OK button 443, a schedule (activity list) screen is displayed.

An example activity list screen 451 is presented in (c) in FIG. 11. On the activity list screen 451, a list of events in the schedule registered in the information management apparatus 40 by the user is displayed. Either the activity list screen 451 or the folder list screen 441 can be displayed first. If the user does not specify what is to be presented, the schedule of that day is transmitted from the information management apparatus 40 for the convenience from the following consideration. There would be many cases where image data of a document used on that day is registered after a meeting or the like. Alternatively, the user specifies the date of the schedule to be obtained. The activity list screen 451 includes an activity list 452, an add button 455, an OK button 453, and a cancel button 454. The user selects, on the activity list 452, one of the schedule items with which the image data is to be associated. The document to be converted into image data is conceivably associated with a schedule item relating to a meeting or the like in which the document is used. However, the user can select any schedule item. The add button 455 is for the user to operate the MFP 70a to add a schedule item to the information management apparatus 40. The user can also associate the image data with the added schedule item.

An example scan execution screen 461 is presented in (d) in FIG. 11. As the user selects a schedule item on the activity list screen 451 and presses the OK button 453, a scan execution screen 461 is displayed. The scan execution screen 461 is for the user to scan the document and transmit the image data to the storage service apparatus 50. The scan execution screen 461 includes a file name field 462, a scan setting field 464, and a start button 463. The file name is a name assigned to the generated image data being a file. A default file name is a combination of a folder name, a schedule item title, and schedule item start time. In the scan setting filed 464, the user sets scanning conditions, such as resolution, print mode (e.g., full-color or black and white), sheet size, and sheet orientation. These settings may be preset to improve operability.

The folder name is acquired from the information storage apparatus 30, and the schedule item title and the schedule item start time are acquired from the information management apparatus 40. The information used for the file name is not limited to these. In one example, the file name is generated as the user selects other information (for example, the schedule item end time, etc.) stored in the information storage apparatus 30 and the information management apparatus 40. This configuration enables automatic assignment of a file name using the information (i.e., folder name and schedule information) stored in an external server (or servers), that is, the information storage apparatus 30 and the information management apparatus 40.

As will be described with reference to FIG. 12, the user can change the file name. The format of the file is, for example, PDF (Portable Document Format), but any format supported by the information storage apparatus 30 is usable. The scan setting field 464 is for allowing the user to set the scan setting (reading setting) of a document. The scan setting field 464 includes a default value field 464*a* and a scan setting button 464*b*. The user confirms the default values. When the user wishes to change the scan setting, the user presses the scan setting button 464*b*. The start button 463 is for the user to determine to cause the MFP 70*a* to scan the document (i.e., a material for a meeting).

An example schedule input screen 471 is presented in (e) in FIG. 11. As the user presses the add button 455 on the activity list screen 451, a schedule input screen 471 is displayed. The schedule input screen 471 is for the user to operate the MFP 70*a* to register a schedule item in the information management apparatus 40. The schedule input screen 471 includes a title field 472, a start time field 473, an end time field 474, an OK button 475, and a cancel button 476. In the title field 472, a schedule item title to be registered as a subject is input. In the start time field 473, start time to be registered as "Start" is input. In the end time field 474, end time to be registered as "End" is input. As the user presses the OK button 475, the screen changes to the scan execution screen 461 illustrated in FIG. 11(*d*).

Figure 12:
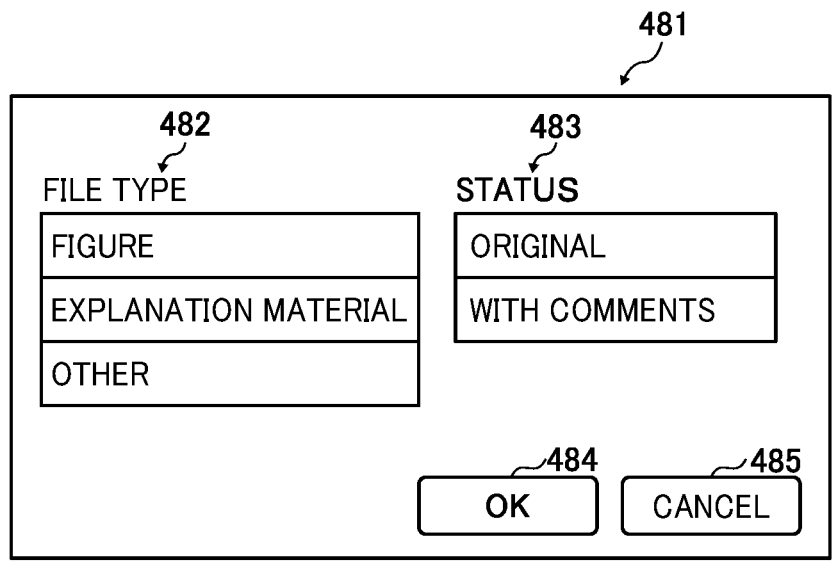
FIG. 12 illustrates an example file name change screen, according to an embodiment.

FIG. 12 illustrates an example file name change screen 481. As the user presses the change button 465 on the scan execution screen 461, the file name change screen 481 is displayed. The file name change screen 481 is for the user to change the file name from the default value. The file name change screen 481 includes a file type field 482, a status field 483, an OK button 484, and a cancel button 485. The file type field 482 is for the user to select or input the data type of the image data. The status field 483 is for the user to select whether the image data is original (not edited) or not (with comments). Thus, the user can easily change the file name. As the user presses the OK button 484, the screen returns to the scan execution screen 461 illustrated in FIG. 11(*d*).

Descriptions of Each Phase and Information Exchanged

Referring to FIGS. 13 to 22B, descriptions are given below of communication among the information input equipment 70, the storage service apparatus 50, the information storage apparatus 30, and the information management apparatus 40, for each phase.

Figure 13:
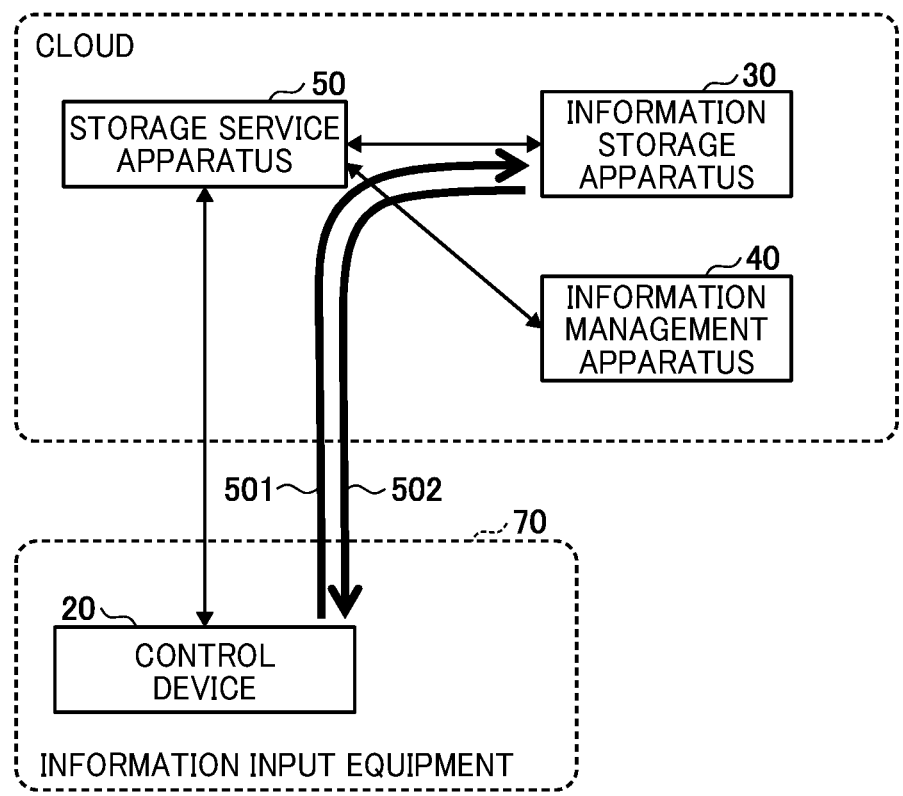
FIG. 13 illustrates a phase in which the information input equipment acquires a folder name from the information storage apparatus, according to an embodiment.

FIG. 13 illustrates a phase in which the information input equipment 70 acquires a folder name from the information storage apparatus 30, and FIGS. 14A and 14B illustrate information exchanged therebetween. As the sign-in completes, the information input equipment 70 transmits the folder name request 501 presented in FIG. 14A in order to acquire the folder name. FIG. 14A illustrates an example folder name request 501, in which "GET/storage/root/children" represents requesting a folder under a root folder by a communication protocol such as HTTP (Hypertext Transfer Protocol), HTTPs, HTTP 2.0, or the like. Note that the storage service apparatus 50 converts the folder name request 501 from the information input equipment 70 into an API of the information storage apparatus 30, if necessary, and transmits the API to the IP address of the information storage apparatus 30, which is preliminarily stored in the storage service apparatus 50.

The information storage apparatus 30 transmits a folder name response 502 to the information input equipment 70 in response to the folder name request 501. FIG. 14B illustrates an example of the folder name response 502. In FIG. 14B, three folder names are transmitted in JSON (JavaScript Object Notation) format. The contents of each item are as follows. id: Folder ID name: Folder name; webUrl: URL type of folder; type: Classification of folder or file For example, the format of the folder name response 502 is XML (Extensible Markup Language) or the like. The same applies to data presented in figures other than FIGS. 14A and 14B. The information input equipment 70 that has acquired the folder name response 502 displays the folder list screen 441 illustrated in FIG. 11(*b*).

Figure 15:
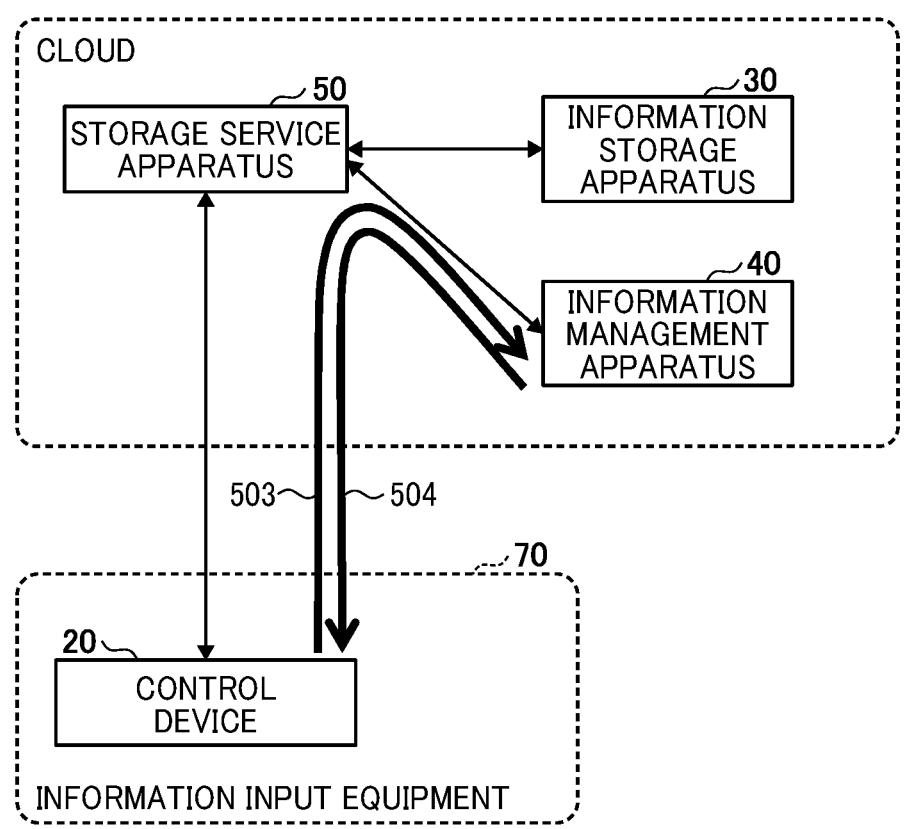
FIG. 15 illustrates a phase in which the information input equipment acquires a schedule name from the information management apparatus, according to an embodiment.

FIG. 15 illustrates a phase in which the information input equipment 70 acquires a schedule name from the information management apparatus 40. FIGS. 16A and 16B illustrate information exchanged therebetween. In response to the acquisition of the folder name response 502, the information input equipment 70 transmits a schedule request 503 illustrated in FIG. 16A in order to acquire an activity list. FIG. 16A illustrates an example schedule request 503. "GET/events?date=2017-06-12" means requesting the schedule items (events) of the current date (2017/06/12) by a communication protocol such as HTTP, HTTPs, HTTP2.0, or the like. Note that the storage service apparatus 50 converts the schedule request 503 from the information input equipment 70 into an API of the information management apparatus 40, if necessary, and transmits the converted schedule request 503 to the IP address of the information management apparatus 40, which is preliminarily stored in the storage service apparatus 50.

In response to the schedule request, the information management apparatus 40 transmits a schedule response 504 corresponding to this user to the information input equipment 70. FIG. 16B illustrates an example schedule response 504. In FIG. 16B, three schedule items are transmitted in JSON format. The contents of each item are: id: schedule ID; subject: title of schedule; webUrl: URL of the folder; body: optional text; start: start time; end: end time. In response to the acquisition of the schedule response 504, the information input equipment 70 displays the activity list screen 451 illustrated in FIG. 11(*c*).

Figure 17:
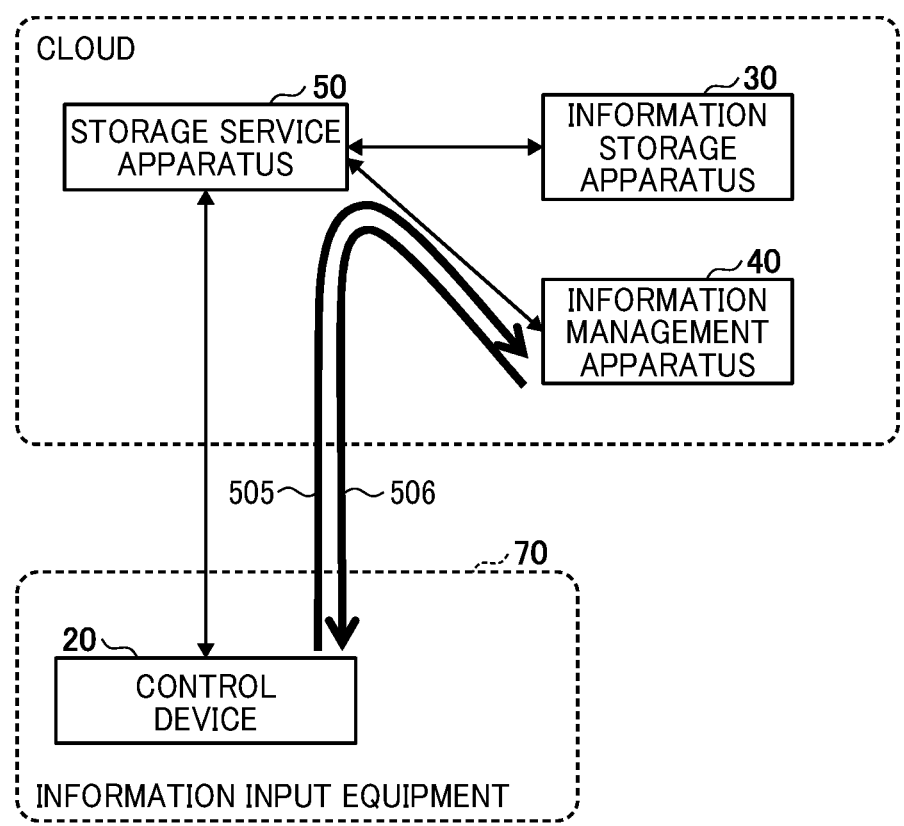
FIG. 17 illustrates a phase in which the information input equipment adds a schedule into the information management apparatus, according to an embodiment.

FIG. 17 illustrates a phase in which the information input equipment 70 adds a schedule item in the information management apparatus 40, and FIGS. 18A and 18B illustrate information exchanged therebetween. Suppose that the user presses the add button 455 on the activity list screen 451 and inputs a schedule item. In order to add the schedule item to the information management apparatus 40, the information input equipment 70 transmits, thereto, a schedule addition request 505 illustrated in FIG. 18A. FIG. 18A illustrates an example of the schedule addition request 505, In which "CREATE/events" is a command accepted by the information management apparatus 40 and means request of creation of a schedule item (event). The "subject", "body", "start", "end" are as described above.

The information management apparatus 40 assigns a schedule ID to the schedule addition request 505 and transmits the schedule addition response 506 to the information input equipment 70. FIG. 18B illustrates an example of the schedule addition response 506. In FIG. 18B, "id" is transmitted in addition to the information illustrated in FIG. 18A. As the information input equipment 70 acquires the schedule ID as described above, the information input equipment 70 can register the storage location information specifying the schedule item.

Figures 19, 20A, 20B:
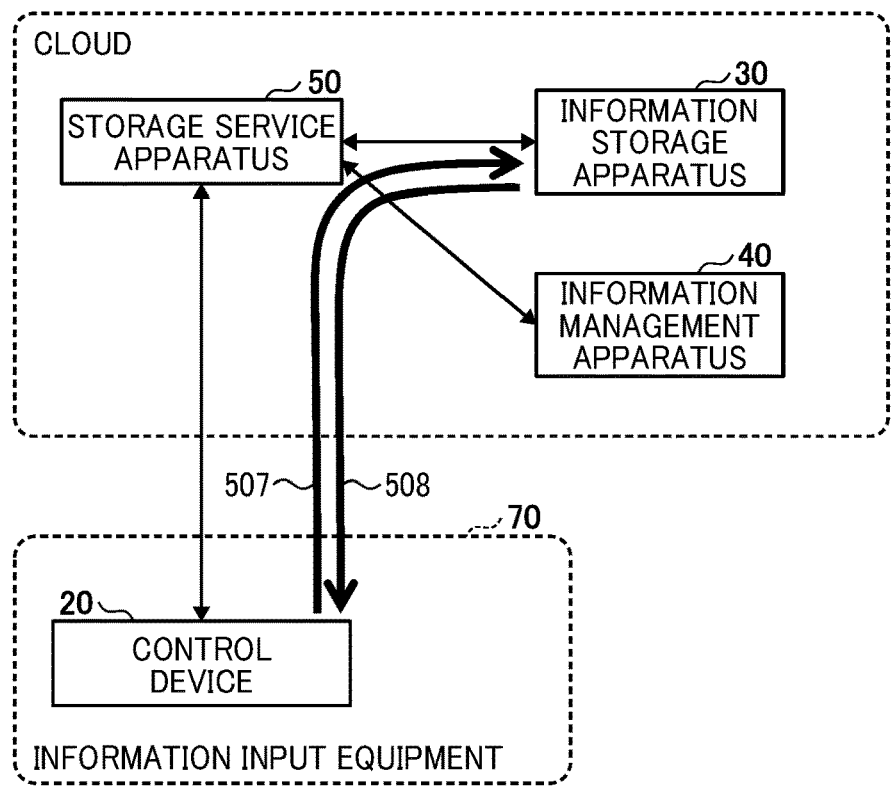
FIG. 19 illustrates a phase in which the information input equipment adds image data into the information storage apparatus, according to an embodiment.
FIGS. 20A and 20B illustrate information exchanged between the information input equipment and the information storage apparatus, according to an embodiment.

FIG. 19 illustrates a phase in which the information input equipment 70 adds image data into the information storage apparatus 30, and FIGS. 20A and 20B illustrate information exchanged therebetween. Suppose that the user presses the start button 463 on the scan execution screen 461. In order to register the image data in the information storage apparatus 30, the information input equipment 70 transmits, thereto, an image data registration request 507 illustrated in FIG. 20A. FIG. 20A illustrates an example of the image data registration request 507, In which "PUT/storage/items/01VA6BAJUT3GIE55APSZHYVIH7N274MIA3/children/MATTER_REVIEW OF FIGURE_201706121000.pdf" means specifying the folder ID and registering "MATTER A_REVIEW OF FIGURE_201706121000.pdf" by a communication protocol such as HTTP, HTTPs, HTTP2.0, or the like. Note that the storage service apparatus 50 converts the image data registration request 507 from the information input equipment 70 into an API of the information storage apparatus 30, if necessary, and transmits the API to the IP address of the information storage apparatus 30, which is preliminarily stored in the storage service apparatus 50.

In response to the image data registration request 507, the information storage apparatus 30 transmits a data registration response 508 including the storage location information of the folder in which the image data is stored, to the information input equipment 70. FIG. 20B illustrates an example of the data registration response 508. In FIG. 20B, "name" represents the file name and "web URL" represents the storage location information.

Figures 21, 22A, 22B:
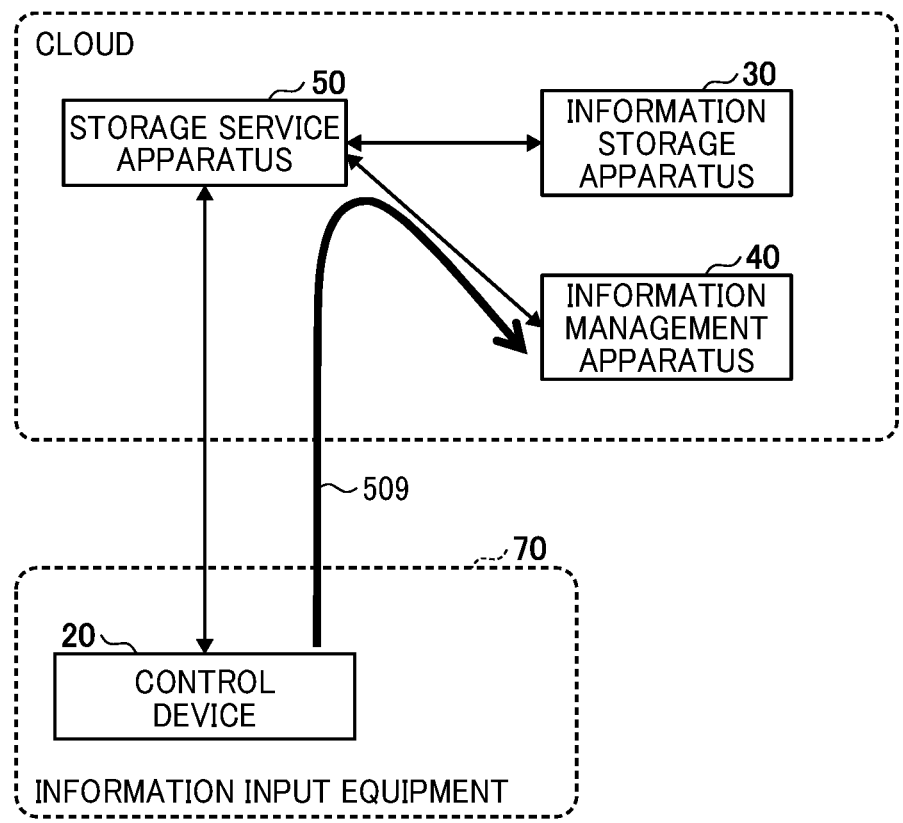
FIG. 21 illustrates a phase in which the information input equipment registers storage location information into the information management apparatus, according to an embodiment.
FIGS. 22A and 22B illustrate information exchanged between the information input equipment and the information management apparatus, according to an embodiment.

FIG. 21 illustrates a phase in which the information input equipment 70 registers the storage location information into the information management apparatus 40, and FIGS. 22A and 22B illustrate information exchanged therebetween. In response to the receipt of the storage location information, the information input equipment 70 designates the schedule item selected on the activity list screen 451 by the user and transmits a storage location information registration request 509 to the information management apparatus 40. Specifically, the information input equipment 70 transmits, thereto, the storage location information registration request 509 illustrated in FIG. 22A. FIG. 22A illustrates an example of the storage location information registration request 509, in which "PATCH/events/aYXB7rP1PAAA" specifies the schedule ID by the API of the information management apparatus 40. FIG. 22B illustrates information registered in "body". "Review figures for meeting on matter A" and "https://storage.com/testuser/KJPOIMmkdjosiH" in "body" means registering these texts. "Review figures for meeting on matter A" is information acquired upon the acquisition of the activity list (i.e., schedule of specified date). Note that the storage service apparatus 50 converts the storage location information registration request 509 from the information input equipment 70 into an API of the information management apparatus 40, if necessary, and transmits the information to the IP address of the information management apparatus 40, which is preliminarily stored in the storage service apparatus 50.

In response to the acquisition of the storage location information registration request 509, the information management apparatus 40 registers the storage location information in "body" of the schedule item specified by the schedule ID.

A description is given below of a sequence of operations.

In the present embodiment, three operation patterns are assumed.

Operation pattern 1 The storage service apparatus 50 accepts a request from the information input equipment 70 and transmits tokens of the information storage apparatus 30 and the information management apparatus 40 to the information input equipment 70. When requesting something from the information storage apparatus 30 and the information management apparatus 40, the information input equipment 70 transmits the respective tokens to the storage service apparatus 50. Using the token, the storage service apparatus 50 requests the information storage apparatus 30 and the information management apparatus 40 to perform processing.

Figure 23:
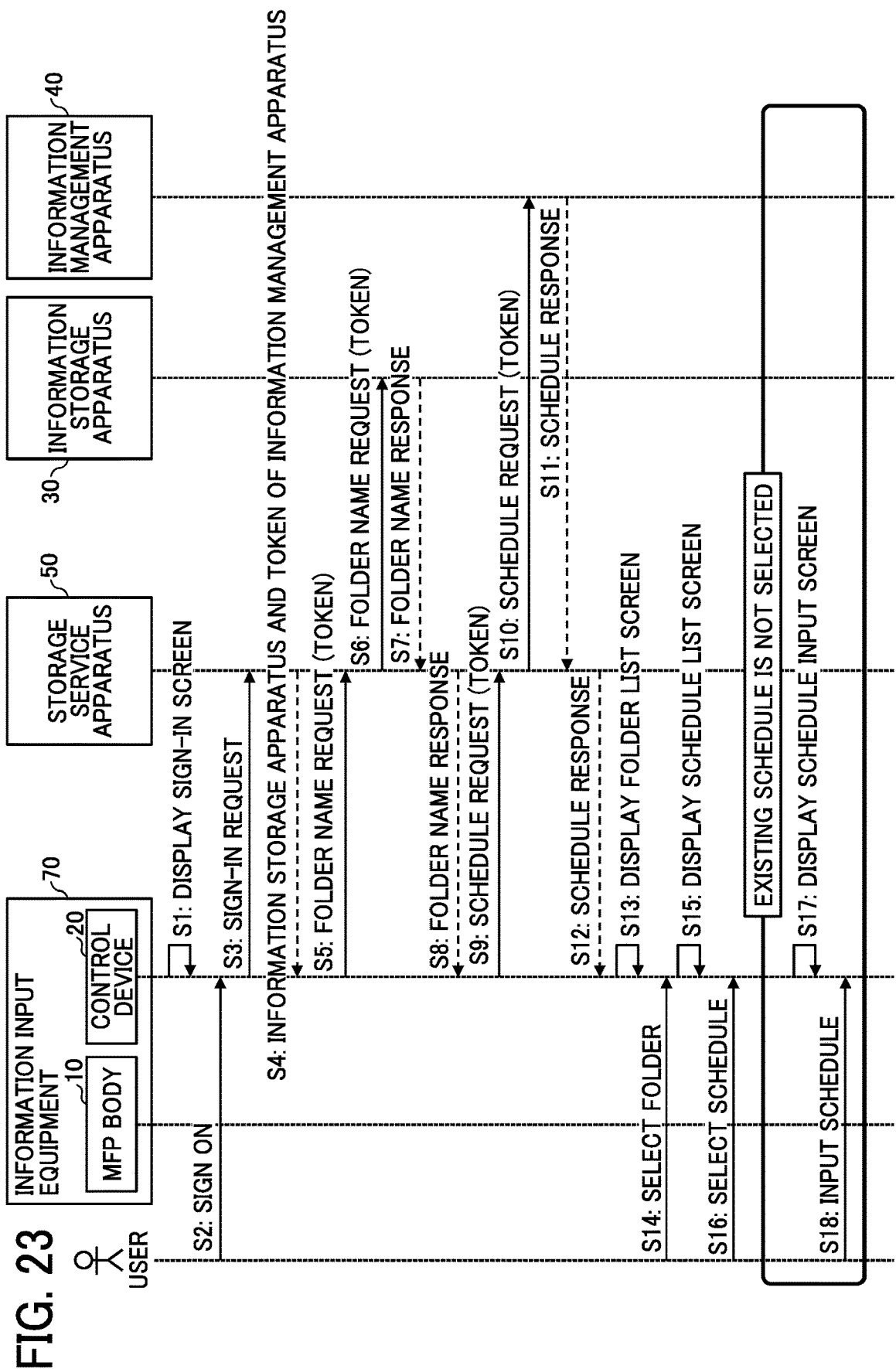
FIG. 23 is a sequence chart illustrating an example procedure performed by the information processing system to register image data according to an embodiment (Operation pattern 1)
Figure 24:
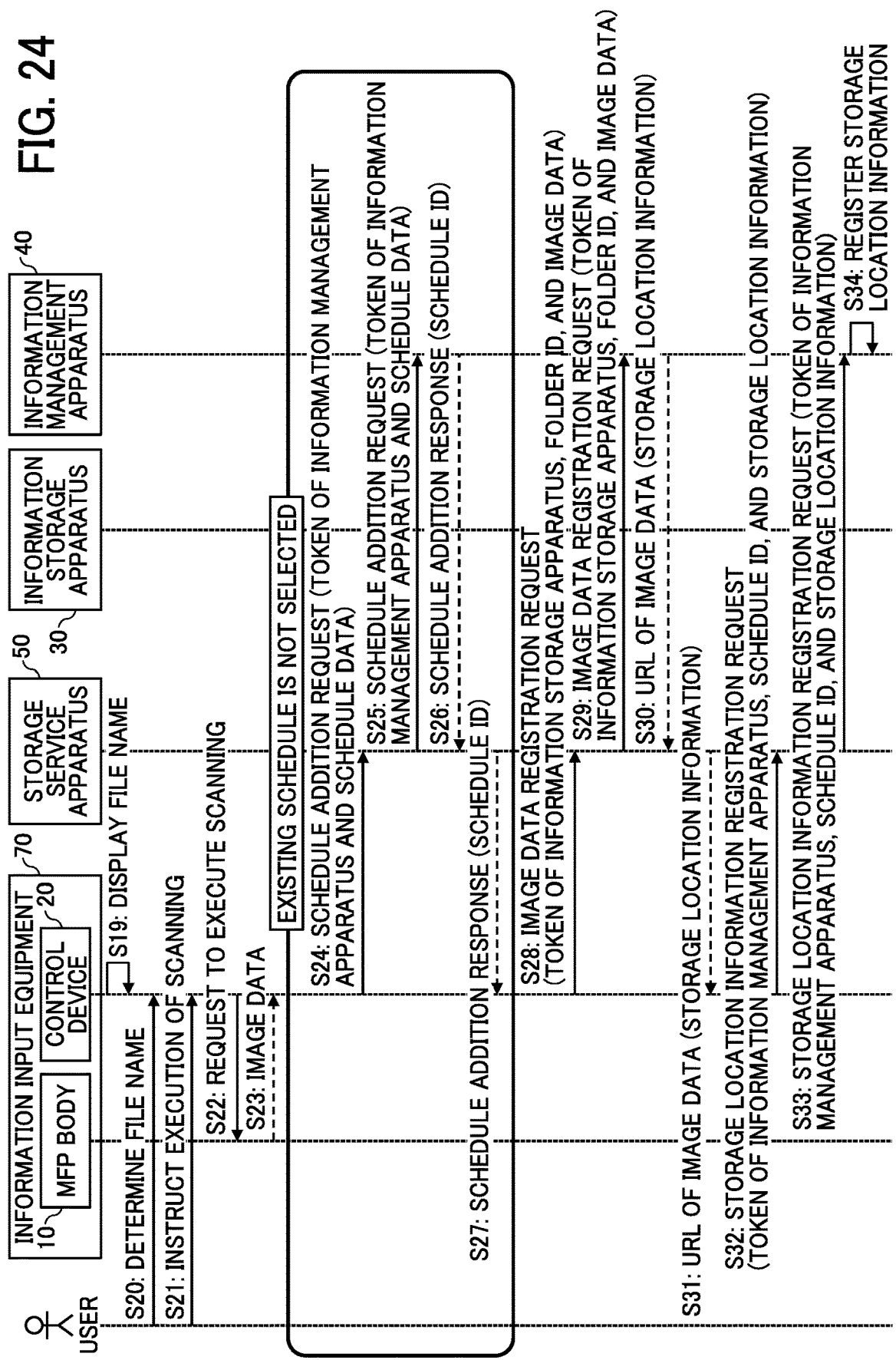
FIG. 24 is a sequence chart illustrating an example procedure performed by the information processing system to register image data according to an embodiment (Operation pattern 1)

FIGS. 23 and 24 are sequence charts illustrating an example procedure performed by the information processing system 100 to register image data. At S1, the display controller 74 of the control device 20 displays the sign-in screen 431. At S2, a user operates the control device 20 to signs in the system. The operation accepting unit 73 of the information input equipment 70 accepts input of a user ID and a password. At S3, the authentication request unit 77 of the control device 20 transmits a sign-in request (user ID and password) to the storage service apparatus 50 via the communication unit 71. The communication unit 51 of the storage service apparatus 50 receives the sign-in request. The authentication unit 52 compares the received user ID and the password with the user ID and the password stored in the storing unit 59 to determine whether authentication succeeds. In FIG. 23, the authentication is successful. At S4, the authentication unit 52 of the storage service apparatus 50 transmits the token of the information storage apparatus 30 and that of the information management apparatus 40 retrieved from the token DB 591, to the information input equipment 70. At S5, the first communication unit 75 of the information input equipment 70 uses the token of the information storage apparatus 30 to transmit a folder name request together with the token to the storage service apparatus 50. At S6, the communication unit 51 of the storage service apparatus 50 receives the folder name request 501 together with the token, and the communication unit 53 transmit the folder name request, together with the token, to the information storage apparatus 30. At S7, the communication unit 31 of the information storage apparatus 30 receives the folder name request together with the token. The information I/O unit 32 retrieves, from the information DB 391, information about the folder associated with the token and transmits a folder name response, to the storage service apparatus 50. At S8, the communication unit 53 of the storage service apparatus 50 receives the folder name response, and the communication unit 51 transmits the folder name response to the information input equipment 70. At S9, the first communication unit 75 of the information input equipment 70 receives the folder name response. Then, the second communication unit 76 of the information input equipment 70 uses the token of the information management apparatus 40 to transmit the schedule request 503, together with the token, to the storage service apparatus 50. At S10, the communication unit 51 of the storage service apparatus 50 receives the schedule request 503 together with the token, and the communication unit 54 transmits the schedule request 503, together with the token, to the information management apparatus 40. At S11, the communication unit 41 of the information management apparatus 40 receives the schedule request 503 together with the token. The schedule I/O unit 42 retrieves, from the schedule DB 491, information about the schedule associated with the token and transmits a schedule response to the storage service apparatus 50. At S12, the communication unit 54 of the storage service apparatus 50 receives the schedule response, and the communication unit 51 transmits the schedule response to the information input equipment 70. At S13, the second communication unit 76 of the information input equipment 70 receives the schedule response. The display controller 74 of the control device 20 displays the folder list screen 441 on the control panel 27. At S14, the user selects a folder to store the image data. The operation accepting unit 73 of the control device 20 accepts the folder selecting. At S15, the display controller 74 of the control device 20 displays the activity list screen 451 on the control panel 27. At S16, the user selects one of the schedule items with which the image data is associated. The operation accepting unit 73 of the control device 20 accepts the selecting of schedule item.

When the user does not select an existing schedule item but presses the add button 455 on the activity list screen 451, the operation at steps S17 and S18 is performed. Note that the process concerning determination whether the existing schedule item is selected or a schedule item is input will be described with reference to FIG. 29. At S17, the display controller 74 of the control device 20 displays the schedule input screen 471 on the control panel 27. At S18, the user inputs a schedule item (an event). The operation accepting unit 73 of the control device 20 accepts an input of the schedule item.

In response to either user's selecting of the folder and the schedule item, or user's selecting of the folder and input of the schedule item, at S19, the display controller 74 of the control device 20 displays the scan execution screen 461 and a file name thereon. At S20, the user either changes the file name from a default name or keeps the default name. The operation accepting unit 73 of the control device 20 accepts input of the file name. At S21, the user presses the start button 463 on the scan execution screen 461. The operation accepting unit 73 of the control device 20 accepts the pressing of the start button 463. At S22, the operation accepting unit 73 of the control device 20 requests the image data generator 72 of the MFP body 10 to execute scanning. At S23, the image data generator 72 scans the document and transmits image data (a file) to the control device 20.

When the user does not select an existing schedule item but adds a schedule item on the schedule input screen 471, operation from S24 to S27 is executed. At S24, the second communication unit 76 of the control device 20 transmits, to the storage service apparatus 50, a schedule addition request, together with the token of the information management apparatus 40 and the schedule data input. At S25, the communication unit 51 of the storage service apparatus 50 receives the schedule addition request. The communication unit 54 transmits, to the information management apparatus 40, the schedule addition request, together with the token of the information management apparatus 40 and the input schedule. At S26, in response to the schedule addition request, the communication unit 41 of the information management apparatus 40 identifies the user with the token, assigns a schedule ID to the schedule, and transmits the schedule addition response, together with the schedule ID, to the storage service apparatus 50. At S27, the communication unit 54 of the storage service apparatus 50 receives the schedule addition response and the schedule ID. The communication unit 51 transmits the schedule addition response and the schedule ID to the information input equipment 70.

Subsequently, the information input equipment 70 registers (stores) the image data in the information storage apparatus 30 and registers the storage location information in the information management apparatus 40. At S28, the data registration request unit 78 of the information input equipment 70 transmits an image data registration request, together with the token of the information storage apparatus 30, the folder ID, and the image data, to the storage service apparatus 50. At S29, the communication unit 51 of the storage service apparatus 50 receives the image data registration request. The communication unit 53 transmits the image data registration request together with the token of the information storage apparatus 30, the folder ID, and the image data, to the information storage apparatus 30. At S30, the communication unit 31 of the information storage apparatus 30 receives the image data registration request. The information I/O unit 32 identifies the user with the token and registers the image data in the folder specified by the folder ID. The information I/O unit 32 acquires a web URL of the folder. The communication unit 31 of the information storage apparatus 30 transmits the web URL as the storage location information to the storage service apparatus 50. At S31, the communication unit 53 of the storage service apparatus 50 receives the storage location information, and the communication unit 51 transmits the storage location information to the information input equipment 70. At S32, the data registration request unit 78 of the information input equipment 70 receives the storage location information. The second communication unit 76 transmits the storage location information registration request 509, together with the token of the information management apparatus 40, the schedule ID, and the storage location information, to the storage service apparatus 50. At S33, the communication unit 51 of the storage service apparatus 50 receives the storage location information registration request 509. The communication unit 54 transmits the storage location information registration request 509 to the information management apparatus 40. At S34, the communication unit 41 of the information management apparatus 40 receives the storage location information registration request 509. The schedule I/O unit 42 identifies the user with the token and registers the storage location information in the body of the schedule specified with the schedule ID.

Operation pattern 2 The storage service apparatus 50 accepts a request from the information input equipment 70 and transmits tokens of the information storage apparatus 30 and the information management apparatus 40 to the information input equipment 70. To request the information storage apparatus 30 and the information management apparatus 40 to do something, the information input equipment 70 sends, using respective tokens, processing requests to the information storage apparatus 30 and the information management apparatus 40, not via the storage service apparatus 50.

Figure 25:
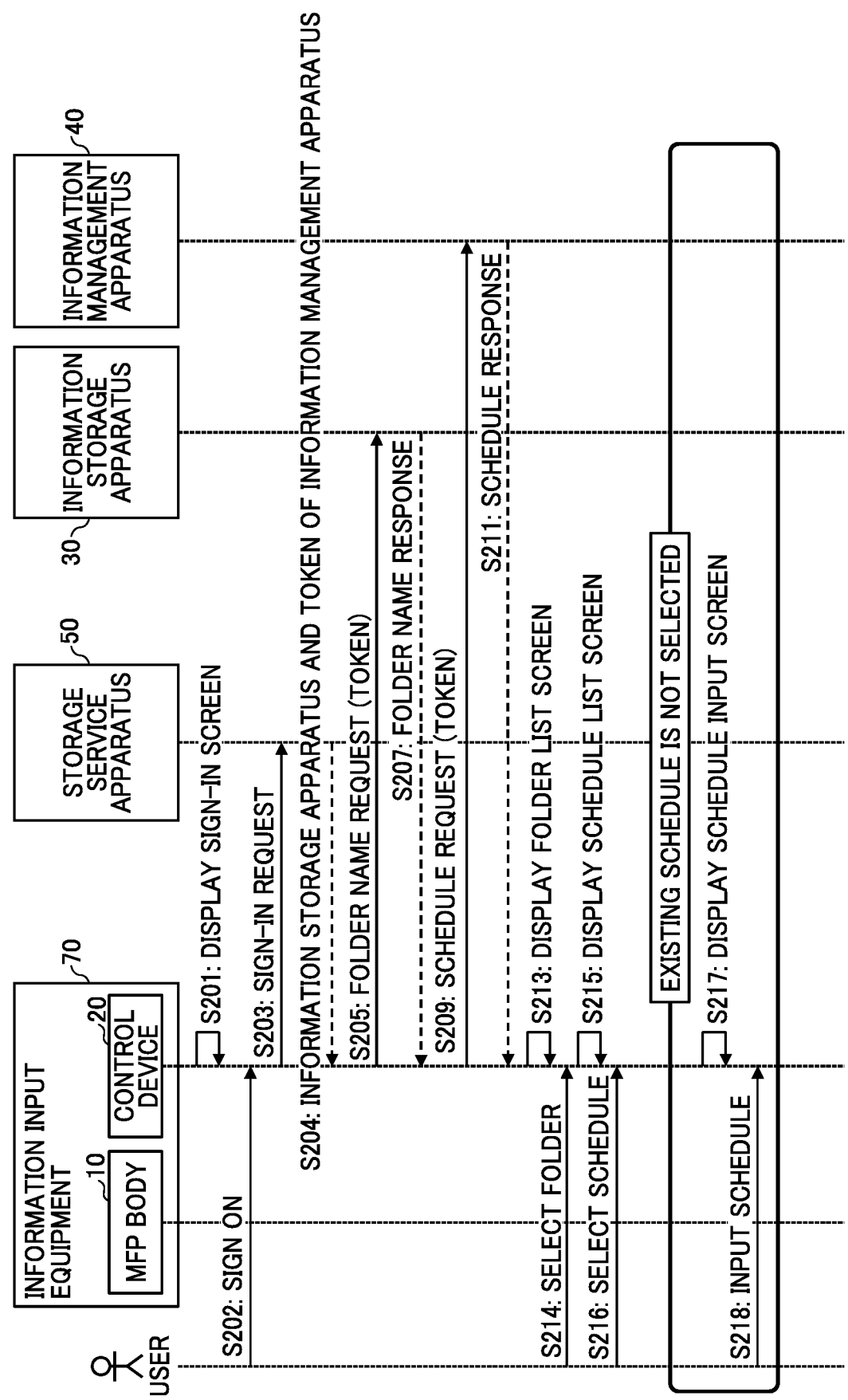
FIG. 25 is a sequence chart illustrating an example procedure performed by the information processing system to register image data according to an embodiment (Operation pattern 2)
Figure 26:
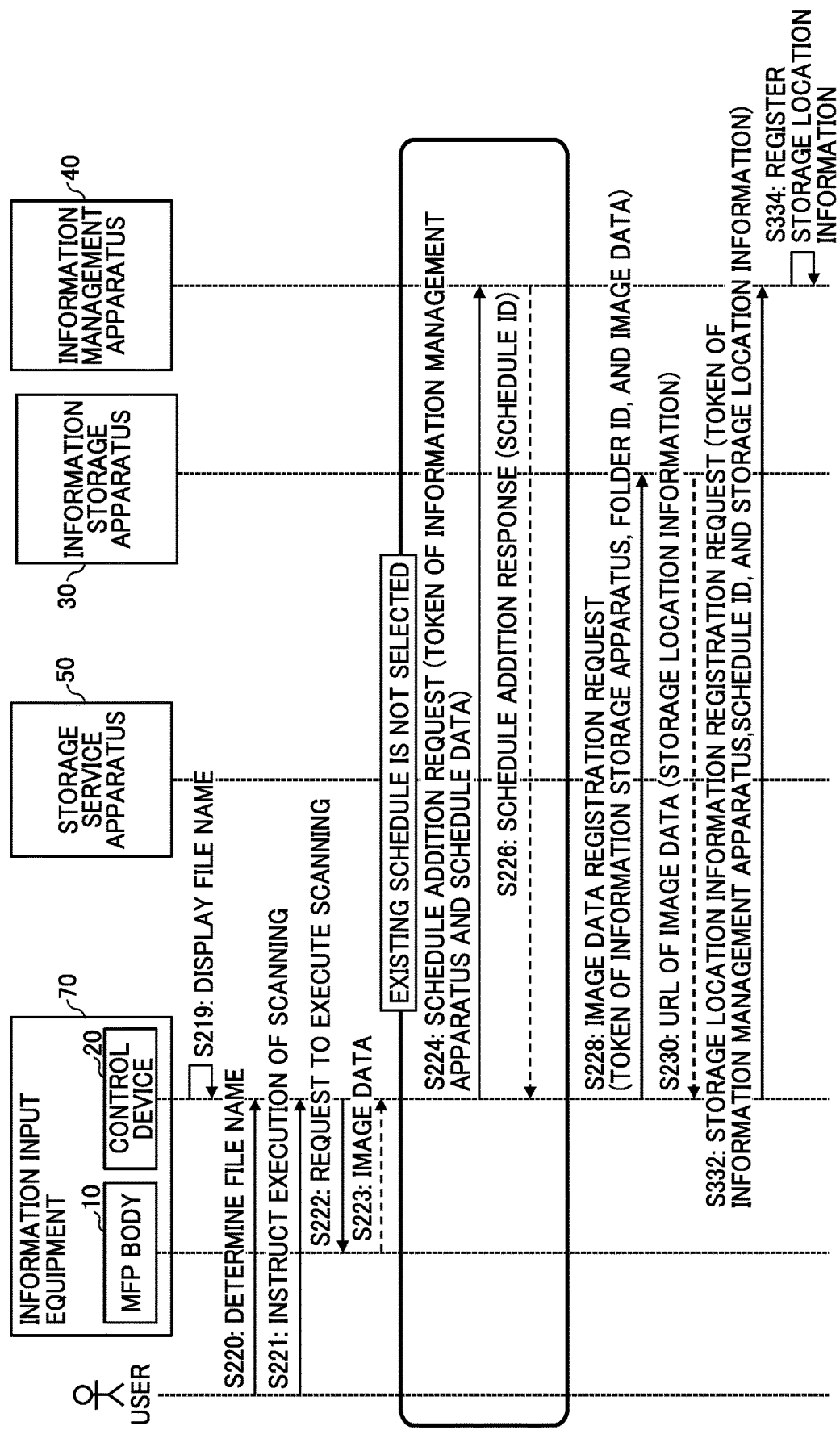
FIG. 26 is a sequence chart illustrating an example procedure performed by the information processing system to register image data according to an embodiment (Operation pattern 2)

FIGS. 25 and 26 are sequence charts illustrating an example procedure performed by the information processing system 100 to register image data, in Operation pattern 2. In the description with reference to FIGS. 25 and 26, differences from the operation illustrated in FIGS. 23 and 24 are focused. Operation from S201 to S204 is similar to the operation from S1 to S4 illustrated in FIGS. 23 and 24.

At S205, the first communication unit 75 of the information input equipment 70 uses the token of the information storage apparatus 30 to transmit the folder name request together with the token to the information storage apparatus 30. Therefore, the step S6 in FIG. 23 becomes unnecessary.

At S207, the communication unit 31 of the information storage apparatus 30 receives the folder name request together with the token. The information I/O unit 32 retrieves, from the information DB 391, information about the folder associated with the token and transmits the folder name response to the information input equipment 70. Therefore, the step S8 in FIG. 23 becomes unnecessary.

At S209, the first communication unit 75 of the information input equipment 70 receives the folder name response. Then, the second communication unit 76 of the information input equipment 70 uses the token of the information management apparatus 40 to transmit a schedule request, together with the token, to the information management apparatus 40. Therefore, Step S10 in FIG. 23 is unnecessary.

At S201, the communication unit 41 of the information management apparatus 40 receives the schedule request together with the token. The schedule I/O unit 42 retrieves, from the schedule DB 491, information about the schedule associated with the token and transmits a schedule response to the information input equipment 70. Therefore, Step S12 in FIG. 23 is unnecessary.

Operation from S213 to S218 and operation from S219 to S223 are similar to the operation from S13 to S18 and from S19 to S23 illustrated in FIGS. 23 and 24. At S224, the second communication unit 76 of the control device 20 transmits, to the information management apparatus 40, a schedule addition request together with the token of the information management apparatus 40 and the schedule information input by the user. Therefore, step S25 in FIG. 24 becomes unnecessary. At S226, in response to the schedule addition request, the communication unit 41 of the information management apparatus 40 identifies the user with the token and assigns a schedule ID to the schedule addition request and transmits the schedule addition response together with the schedule ID to the information input equipment 70. Therefore, step S27 in FIG. 24 becomes unnecessary.

At S228, the data registration request unit 78 of the information input equipment 70 transmits an image data registration request together with the token of the information storage apparatus 30, the folder ID, and the image data, to the information storage apparatus 30. Therefore, step S29 in FIG. 24 becomes unnecessary.

At S230, the communication unit 31 of the information storage apparatus 30 receives the image data registration request. The information I/O unit 32 identifies the user with the token and registers the image data in the folder specified by the folder ID. The information I/O unit 32 acquires the web URL of the folder. The communication unit 31 of the information storage apparatus 30 transmits the web URL as the storage location information to the information input equipment 70. Therefore, step S31 in FIG. 24 is not required.

At S232, the data registration request unit 78 of the information input equipment 70 receives the storage location information. The second communication unit 76 transmits the storage location information registration request 509, together with the token of the information management apparatus 40, the schedule ID, and the storage location information, to the information management apparatus 40. Therefore, step S33 in FIG. 24 becomes unnecessary.

At S234, the communication unit 41 of the information management apparatus 40 receives the storage location information registration request 509. The schedule I/O unit 42 identifies the user with the token and registers the storage location information in "body" of the schedule item specified with the schedule ID.

Operation pattern 3 Upon accepting a login from the information input equipment 70, the storage service apparatus 50 transmits, to the information input equipment 70, a token for accepting processing from the information input equipment 70. In the case where the information input equipment 70 requests the information storage apparatus 30 or the information management apparatus 40 to acquire a folder, schedule, or the like, the information input equipment 70 transmits, to the storage service apparatus 50, a request using the token issued from the storage service apparatus 50. Based on the token issued by the storage service apparatus 50, the storage service apparatus 50 identifies the tokens of the corresponding information storage apparatus 30 and the corresponding information management apparatus 40, and uses the tokens to request processing from the information storage apparatus 30 and the information management apparatus 40. That is, in Operation pattern 3, the storage service apparatus 50 does not transmit the token of the information storage apparatus 30 and that of the information management apparatus 40 to the information input equipment 70.

In Operation pattern 3, the information stored in the token DB 591 in Table 1 changes as follows.

TABLE 4

| User ID | Password | Token of Storage Service Apparatus | Token of Information Storage Apparatus | Token of Information Management Apparatus |
|---------|----------|----------|----------|----------|
| testuser | ******* | 129475A | ABCDEFG | HIGKLMN |
| testuser2 | ****** | 4789bgf | OPQRSTU | VXYZABCD |
| . | . | . | . | . |
| . | . | . | . | . |

Table 4 illustrates an example of information stored in the token DB 591 in Operation pattern 3. The token DB 591 in Table 4 includes items of tokens of the storage service apparatus 50. That is, when a user signs in the system, a token of the storage service apparatus 50 is generated and associated with each user.

Figure 27:
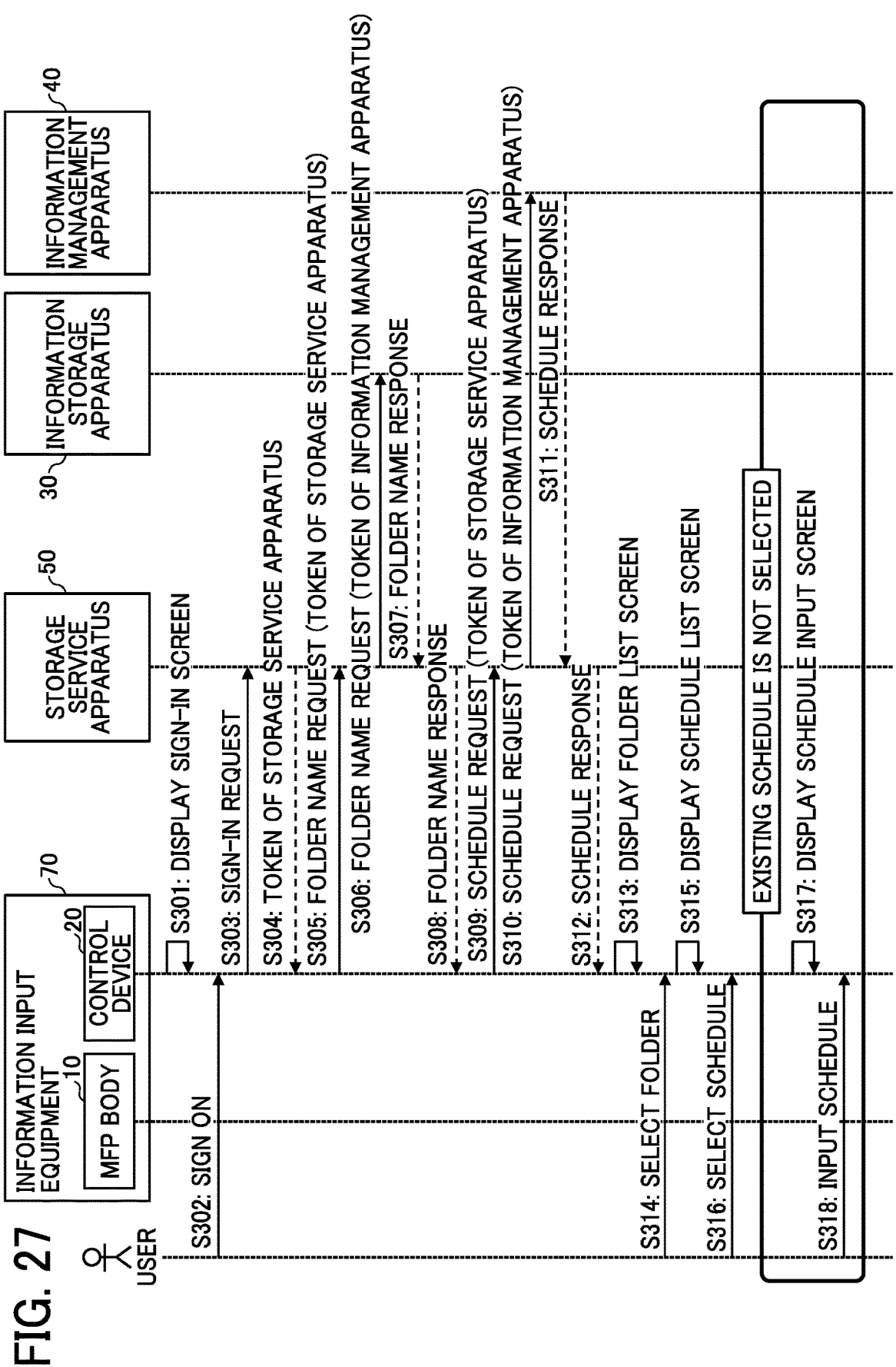
FIG. 27 is a sequence chart illustrating an example procedure performed by the information processing system to register image data according to an embodiment (Operation pattern 3)
Figure 28:
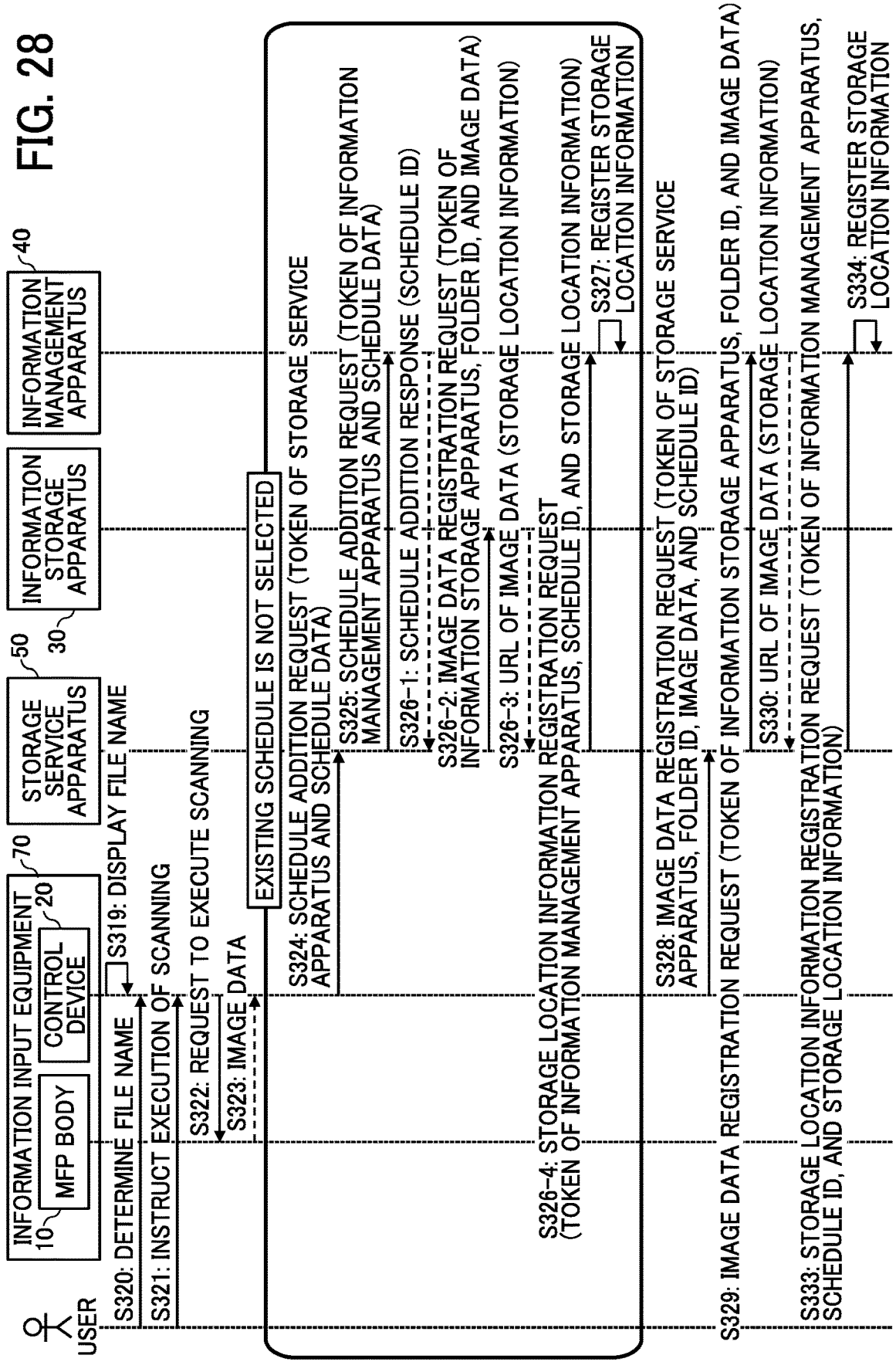
FIG. 28 is a sequence chart illustrating an example procedure performed by the information processing system to register image data according to an embodiment (Operation pattern 3)

FIGS. 27 and 28 are sequence charts illustrating an example procedure of Operation pattern 3 performed by the information processing system 100 to register image data. In the description with reference to FIGS. 27 and 28, differences from the operation illustrated in FIGS. 23 and 24 are focused. Operation from S301 to S303 is similar to that from S1 to S3 in FIG. 23.

At S304, the authentication unit 52 of the storage service apparatus 50 generates a token of the storage service apparatus 50 for specifying the user who has signed in the system and registers the token in the token DB 591 in association with the user ID. The authentication unit 52 of the storage service apparatus 50 transmits the token of the storage service apparatus 50 to the information input equipment 70.

Therefore, at S305 and S308, the token of the storage service apparatus 50 is transmitted to the storage service apparatus 50. At S306 and S310, the token of the information storage apparatus 30 or the token of the information management apparatus 40 associated with the token of the storage service apparatus 50 is transmitted to the information storage apparatus 30 or the information management apparatus 40.

The operations from S311 to S318 and from S319 to S323 are similar to the operations from S11 to S18 and from S19 to S23 illustrated in FIGS. 23 and 24.

Operation from S324 to S334 is performed when an existing schedule item is not selected. At S324, a schedule addition request is transmitted to the storage service apparatus 50 by the token of the storage service apparatus 50. Since the storage service apparatus 50 stores the token of the storage service apparatus 50, communication between the information input equipment 70 and the storage service apparatus 50 becomes unnecessary. Therefore, at S326-2 and S326-4, the storage service apparatus 50 uses the token of the information storage apparatus 30 and the token of the information management apparatus 40, both associated with the token of the storage service apparatus 50, to communicate with the information storage apparatus 30 and the information management apparatus 40.

Operation starting from S328 is performed when an existing schedule is selected. At S328, an image data storage request is transmitted to the storage service apparatus 50 by the token of the storage service apparatus 50, similarly. However, the schedule ID is transmitted to the storage service apparatus 50 at this point from the following reason. Since the storage service apparatus 50 stores the token of the storage service apparatus 50, the operation at S331 and S332 is unnecessary, and the timing at which the schedule ID is transmitted disappears.

At S329 and S333, the storage service apparatus 50 communicates with the information storage apparatus 30 and the information management apparatus 40 using the token of the information storage apparatus 30 and the token of the information management apparatus 40, both associated with the token of the storage service apparatus 50.

Descriptions are given below of determination as to whether an existing schedule has been selected.

Figure 29:
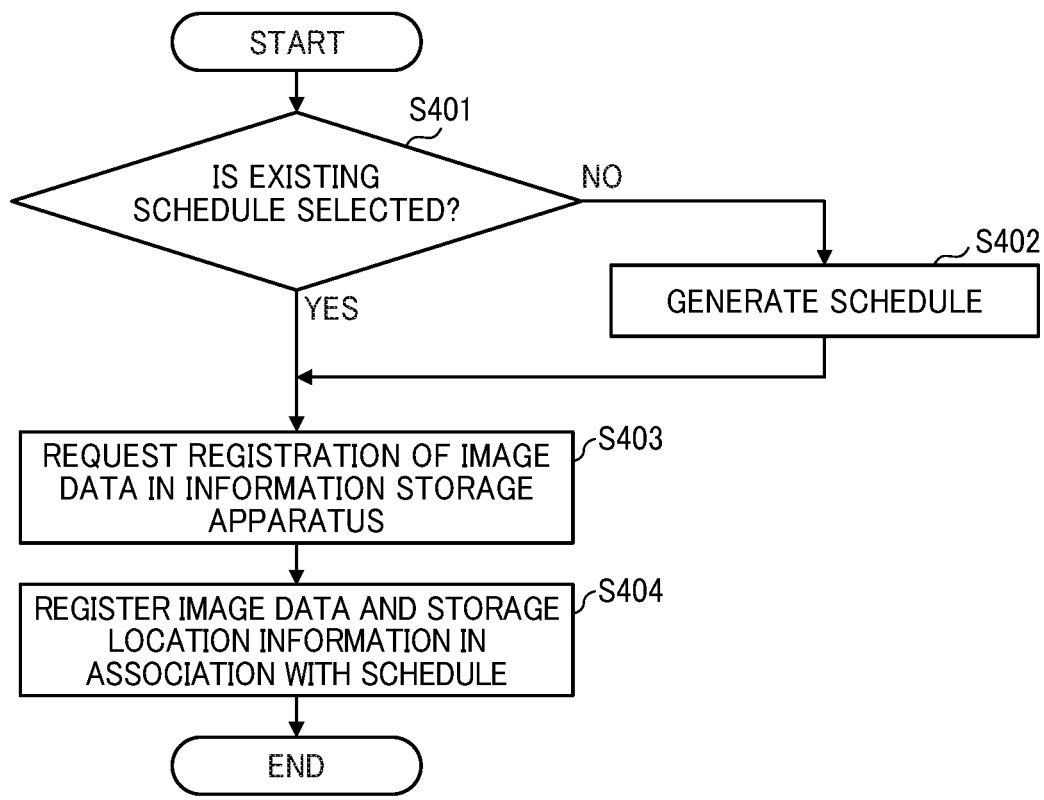
FIG. 29 is a flowchart illustrating an example procedure of input and registration of a schedule.

FIG. 29 is a flowchart illustrating an example procedure of schedule input and schedule registration. The process illustrated in FIG. 29 starts, for example, when the activity list screen 451 is displayed.

At S401, the operation accepting unit 73 of the control device 20 determines whether the user has selected an existing schedule item (e.g., event).

When the determination at S401 is "No", the schedule generator 80 of the information input equipment 70 generates (adds) a schedule item (S402).

When the determination at S401 is "Yes" or subsequent to S402, the data registration request unit 78 of the information input equipment 70 requests registration of image data to the information storage apparatus 30 (S403).

At S404, the information input equipment 70 registers the image data (obtained by scanning) and registers the storage location information thereof in the information management apparatus 40 in association with the schedule item.

Thus, when the user adds a schedule item instead of selecting an existing one, the operation is similar.

Operation of Information Input Equipment

Figure 30:
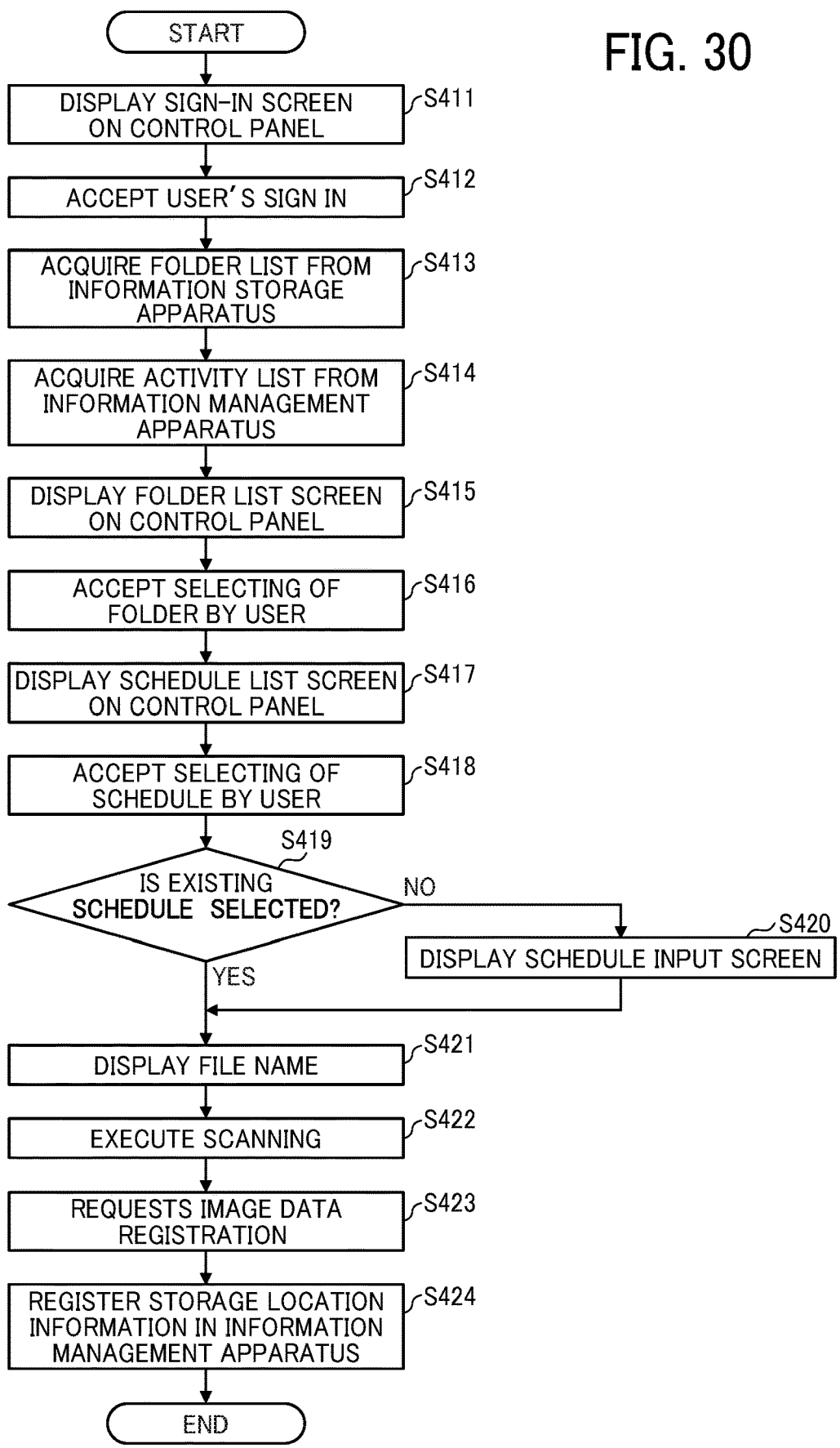
FIG. 30 is a flowchart of an example operation performed by the information input equipment according to an embodiment.

FIG. 30 is a flowchart of an example operation performed by the information input equipment 70. At S411, the display controller 74 of the information input equipment 70 displays the sign-in screen 431 on the control panel 27. At S412, the operation accepting unit 73 accepts sign-in of the user.

At S413, the first communication unit 75 of the information input equipment 70 acquires a folder list from the information storage apparatus 30.

At S414, the second communication unit 76 of the information input equipment 70 acquires an activity list (i.e., schedule) from the information management apparatus 40. The order of S413 and S414 can be reversed.

At S415, the display controller 74 of the information input equipment 70 displays the folder list screen 441 on the control panel 27. At S416, the operation accepting unit 73 accepts the selecting of a folder made by the user.

At S417, the display controller 74 of the information input equipment 70 displays the activity list screen 451 on the control panel 27. At S418, the operation accepting unit 73 accepts selecting of a schedule item made by the user.

At S419, the operation accepting unit 73 of the information input equipment 70 determines whether the user has selected an existing schedule item.

When the determination at S419 is "No", the display controller 74 displays the schedule input screen 471 on the control panel 27 (S420). The operation accepting unit 73 accepts an input of schedule item (i.e., a calendar entry).

At S421, the display controller 74 of the information input equipment 70 displays a file name on the scan execution screen 461.

In response to the user's pressing of the start button on the scan execution screen 461, the image data generator 72 scans the document to generate image data (S422).

At S423, the data registration request unit 78 of the information input equipment 70 requests the information storage apparatus 30 to register the image data.

At S424, the information input equipment 70 registers the storage location information of the image data, in association with the schedule, in the information management apparatus 40.

Registration of Storage Location Information by Referred Attachment

In the above-described embodiment, the storage location information is registered in "Body" of the schedule item. In addition to such a manner of registration, the information input equipment 70 can register the storage location information in the information management apparatus 40 in referred attachment. The term "referred attachment" means a manner of registration to present image data to a user as if the image data is stored in the information management apparatus 40 while the information storage apparatus 30 stores the entity of the image data. There is a term "simple attachment" similar to referred attachment. In the case of registration manner "simple attachment", the information management apparatus 40 stores the entity of the image data.

Figure 31:
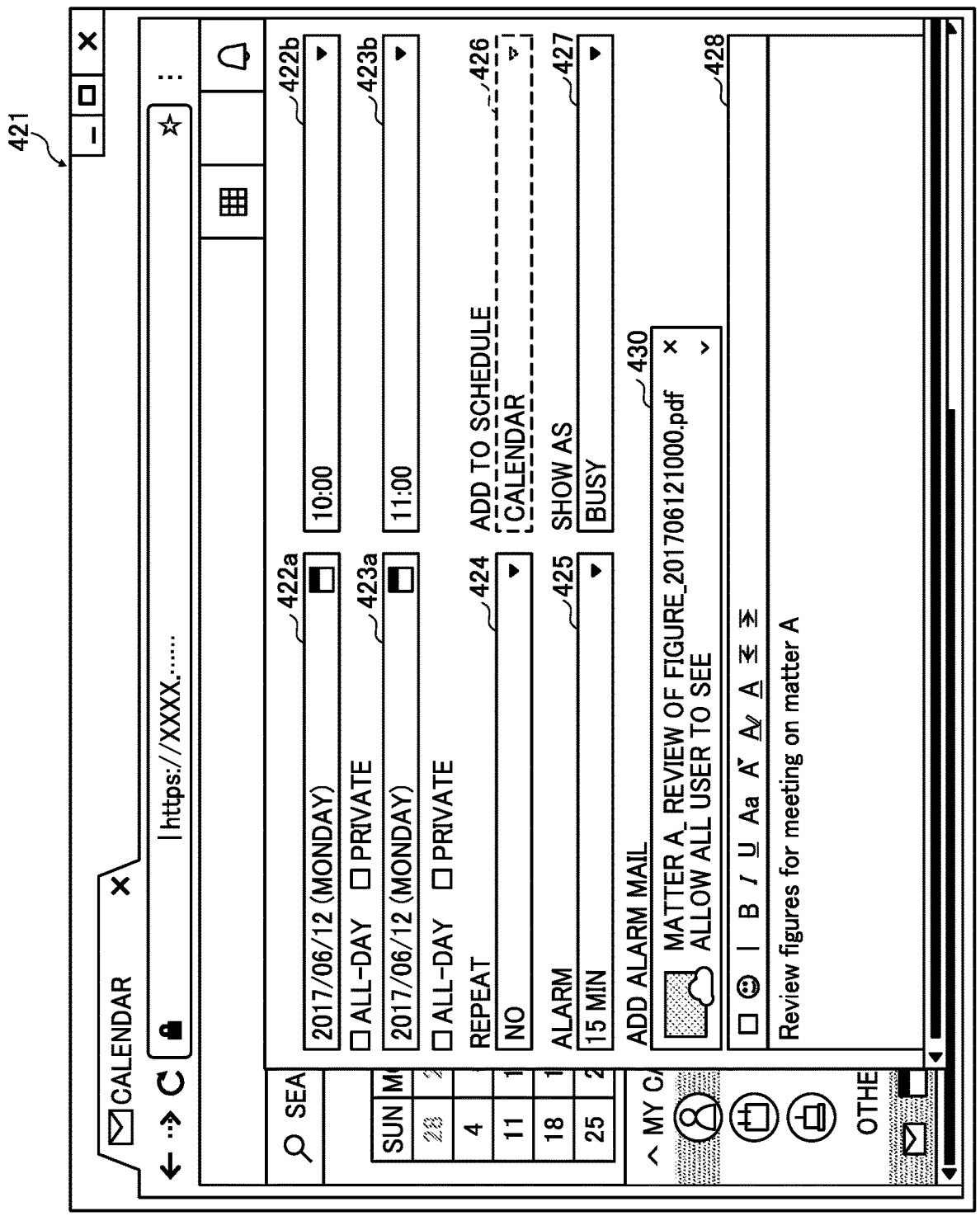
FIG. 31 illustrates a schedule screen on the terminal device when storage location information is registered in the information management apparatus as a referred attachment, according to an embodiment.

FIG. 31 illustrates one example of the schedule detail screen 421 on the terminal device 60 when the storage location information is registered in the information management apparatus 40 as a referred attachment. A description is given below of differences between the configuration illustrated in FIG. 31 and that illustrated in FIG. 10.

The schedule detail screen 421 illustrated in FIG. 31 includes a referred attachment field 430. In the referred attachment field 430, the file name of the image data is indicated. Therefore, the user presses the file name, not the web URL specified in "Body", to view the image data. The storage location information (webURL) is linked to the referred attachment field 430. Although the user is not able to directly view at the storage location information, similar to the configuration in which the web URL is specified in "Body", the storage location information is registered in association with the schedule.

Figures 32, 33A, 33B:
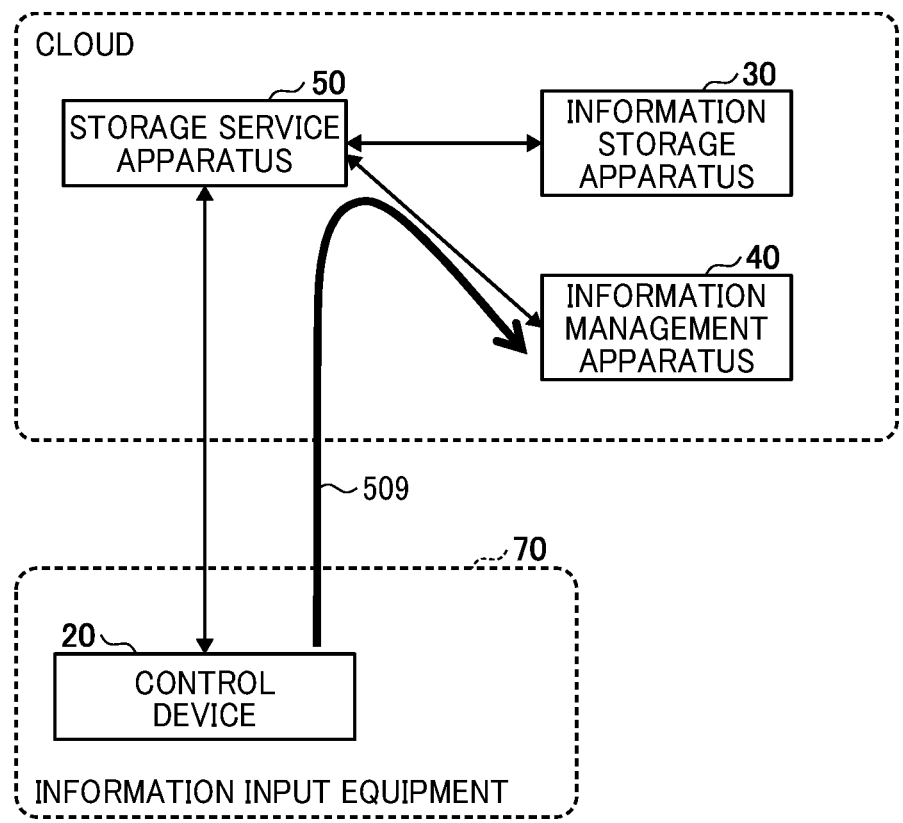
FIG. 32 illustrates a phase in which the information input equipment registers storage location information into the information management apparatus, according to an embodiment.
FIGS. 33A and 33B illustrate information exchanged between the information input equipment and the information management apparatus, according to an embodiment.

FIG. 32 illustrates a phase in which the information input equipment 70 registers storage location information in the information management apparatus 40, and FIGS. 33A and 33B illustrate information exchanged therebetween. In response to the receipt of the storage location information, the information input equipment 70 designates the schedule item selected on the activity list screen 451 by the user and transmits a storage location information registration request 509 to the information management apparatus 40. The information input equipment 70 transmits the storage location information registration request 509, for example, illustrated in FIG. 33A. FIG. 33A illustrates an example of the storage location information registration request 509 in the case of referred attachment, in which "PATCH/events/aYXB7rP1PAAA=/attachments" means designating the schedule ID with the API of the information management apparatus 40 and requesting referred attachment of storage location information. In FIG. 33A, "attachments" means referred attachment. In in FIG. 33B, "ReferenceUrl": https:// storage.com/testuser/KJPOIMmkdjosiH" is the URL of the image data and indicates the URL to be referred to.

In response to the acquired storage location information registration request 509, the information management apparatus 40 acquires the file name of the image data specified by "referenceUrl", from the information storage apparatus 30, and stores the storage location information and the file name in association with the schedule item. As a result, the information management apparatus 40 can display the file name of the image data in the referred attachment field 430 on the schedule detail screen 421, and can link the storage location information therewith.

the information input equipment 70 captures the screen thereof. Other operations (from S511 to S521, S523, and S524) are similar to the operations performed by the MFP 70a (from S411 to S421, S423, and S424).

As described above, even when the electronic whiteboard 70b is used as the information input equipment 70, the image data can be managed in association with the schedule.

Operation of Information Processing Apparatus as Information Input Equipment

When the information processing apparatus 70c is used as the information input equipment 70, the operation differs from that illustrated in FIG. 30 in that image data is acquired

TABLE 5

| Token of Information Management Apparatus | User ID of Information Management Apparatus | Subject | Schedule ID | Body | Start | End | reference Url | File Name |
|---|---|---|---|---|---|---|---|---|
| HIGKLMN | testuseruser | Review of Figure | aYXB7rPIPAAA | Review figures for meeting on matter A. | 2017-06-12 T 10:00:00 | 2017-06-12 T 11:00:00 | https://storage.com/testuser/Hndkjaoilhe | Matter A_Review of Figures_201706121000.pdf |
| | | Matter A Meeting | bLKB7rPIOAAA | MEETING WITH COMPANY A | 2017-06-12 T 13:00:00 | 2017-06-12 T 14:00:00 | — | |
| | | Regular Meeting | cIMB1yAgRAAA | CHECK PROGRESS OF ALL MATTERS | 2017-06-12 T 15:00:00 | 2017-06-12 T 16:00:00 | — | |

Table 5 schematically illustrates information stored in the schedule DB 491. Descriptions are given of differences of Table 5 from Table 3. The schedule DB 491 in Table 5 further includes items "referenceUrl" and "file name". As described above, the reference Url corresponds to the storage location information, and the file name is the name of the image data file acquired from the information storage apparatus 30 based on the storage location information.

Operation of Electronic Whiteboard as Information Input Equipment

In the case where the electronic whiteboard 70b is used as the information input equipment 70, the overall operation is similar to that performed by the MFP 70a. Differently from the above-described operation of the MFP 70a, the image is captured instead of being scanned.

Figure 34:
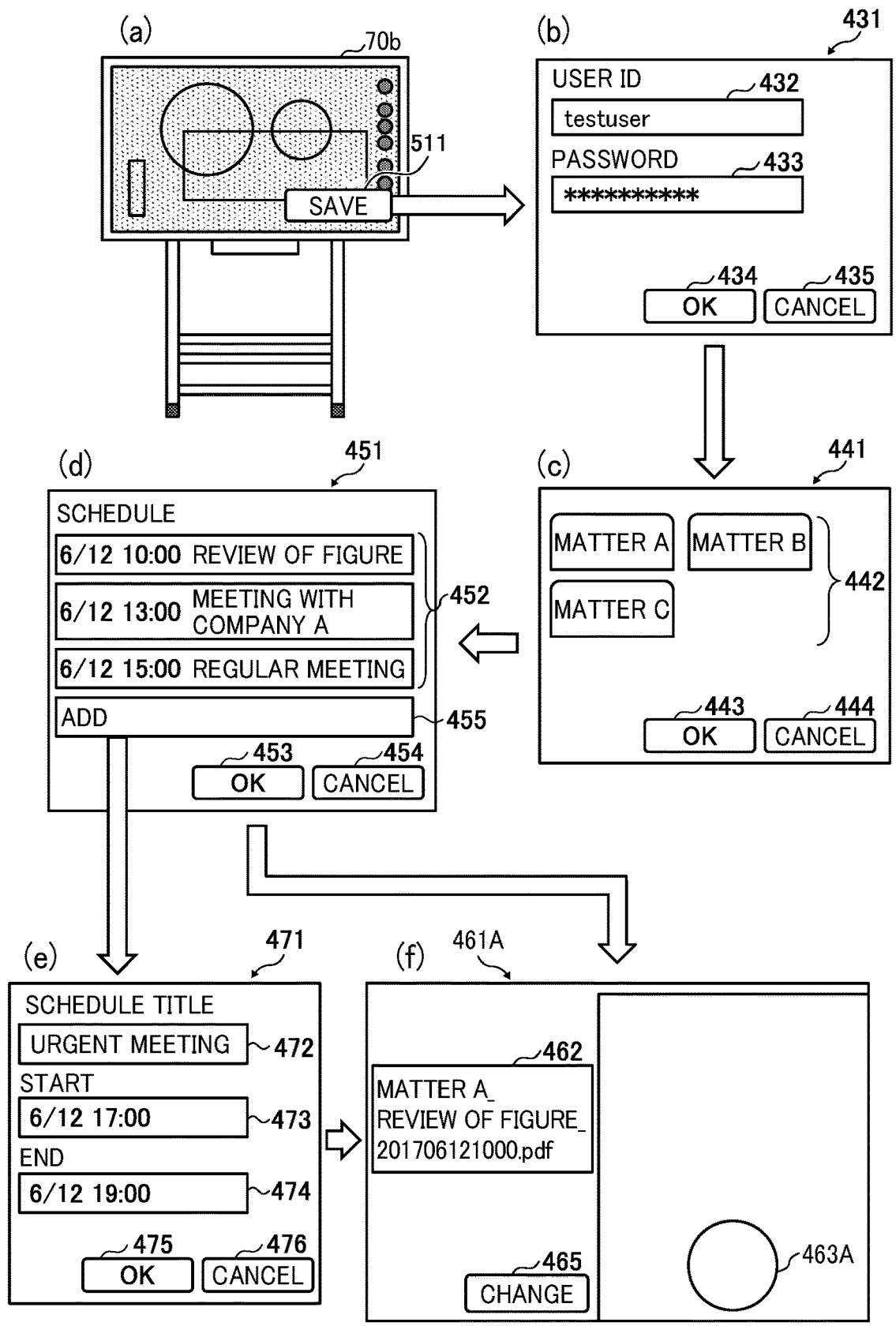
FIG. 34 illustrates an example sign-in screen on an electronic whiteboard according to an embodiment.

FIG. 34 illustrates an example of screen transition including the sign-in screen 431 on the electronic whiteboard 70b. As illustrated in (a) in FIG. 34, when the user presses the save button 511 displayed on the electronic whiteboard 70b, the sign-in screen 431 is presented as illustrated in (b) in FIG. 34. The screens illustrated in (c, (d), and (e) of FIG. 34 are similar to those illustrated in (b), (c), and (e) of FIG. 11, respectively. Needless to say, the screen design can be different between the MFP 70a and the electronic whiteboard 70b. Instead of the scan execution screen 461 in (d) of FIG. 11, for example, a capture screen 461A in (f) of FIG. 34 is displayed, and a capture button 463A is displayed instead of the start button 463 on the scan execution screen 461. As the user presses the capture button 463A, a screenshot of the electronic whiteboard 70b is captured as image data.

Figure 35:
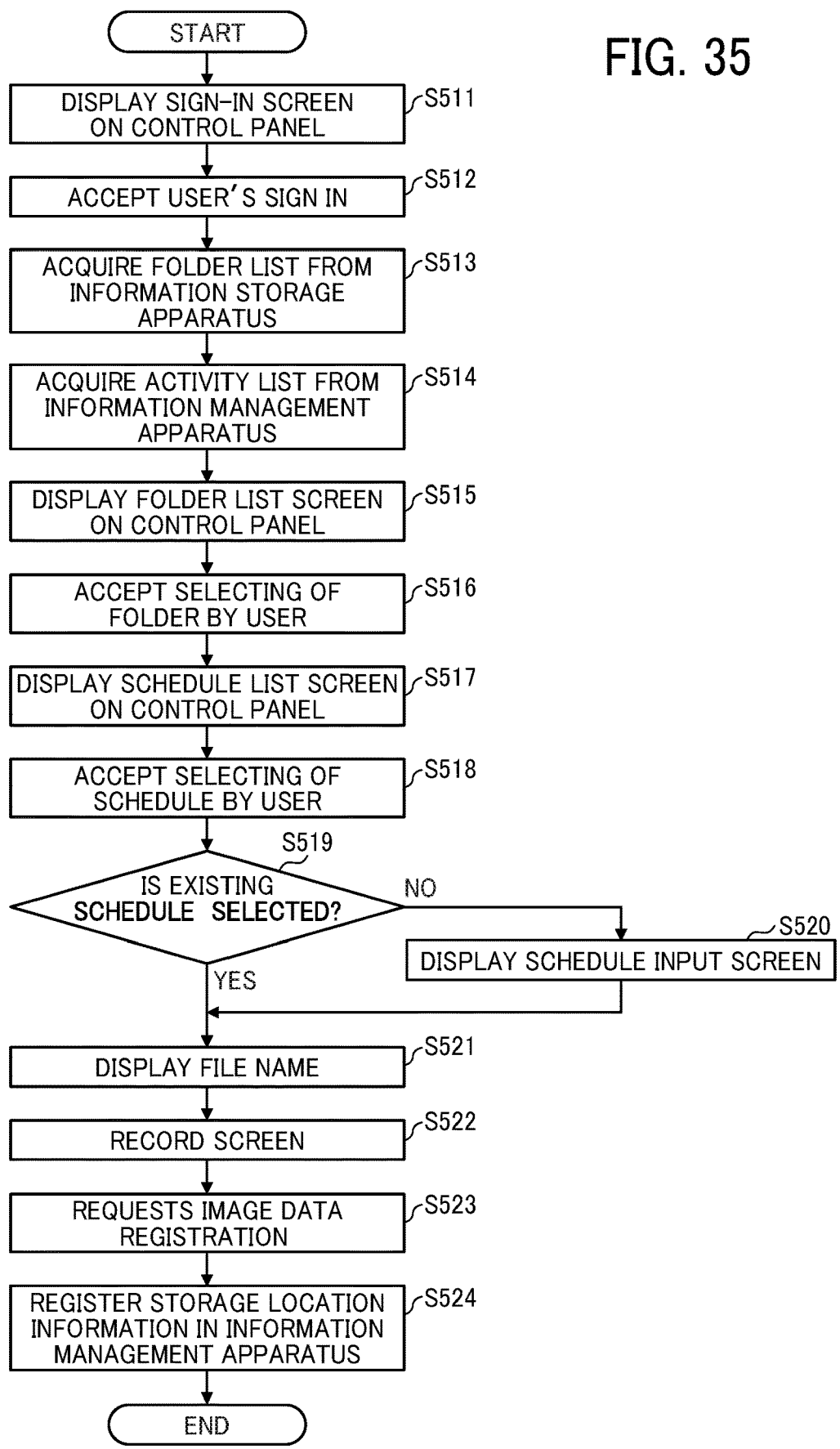
FIG. 35 is a flowchart of an example operation performed by an electronic whiteboard as the information input equipment according to an embodiment.

FIG. 35 is a flowchart of an example operation performed by the electronic whiteboard 70b being the information input equipment 70. The operation illustrated in FIG. 35 is different from the operation illustrated in FIG. 30 in that, in FIG. 35, at S522, the electronic whiteboard 70b serving as by imaging (e.g., taking a picture) instead of scanning and that the timing of acquisition (capturing) of image is different.

Figure 36:
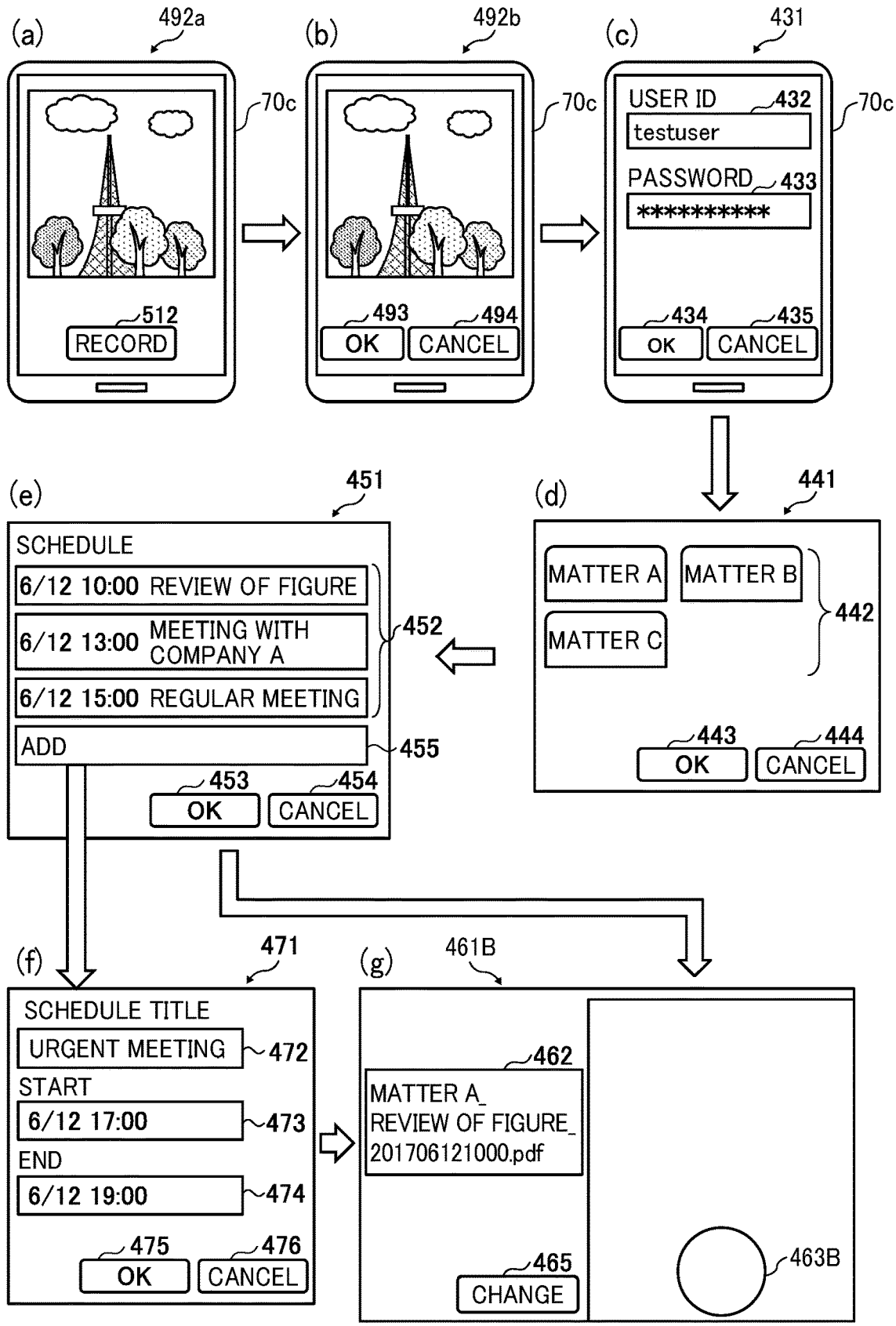
FIG. 36 illustrates an example sign-in screen on an information processing apparatus according to an embodiment.

FIG. 36 illustrates an example of screen transition including the sign-in screen 431 on the information processing apparatus 70c. For example, a user takes a picture of a whiteboard using an imaging device in a state in which an application program is active. In this case, the whiteboard does not have a screen capture function, and the application program generates image data by imaging. Alternatively, for example, the application program retrieves preliminarily stored image data.

For example, as the user presses a record button 512 (or a shutter button) on an imaging screen 492a illustrated in (a) of FIG. 36, displayed by the application program, the screen switches to an image data screen 492b illustrated in (b) of FIG. 36. When the user presses an OK button 493, the sign-in screen 431 is displayed as illustrated in (c) of FIG. 36. When a cancel button 494 is pressed, the image data is canceled. The screens illustrated in (d), (e), and (f) of FIG. 36 are similar to those illustrated in (b), (c), and (e) of FIG. 11, respectively. Needless to say, the screen design can be different between the MFP 70a and the information processing apparatus 70c. Instead of the scan execution screen 461 in (d) of FIG. 11, for example, a transmission screen 461B in (g) of FIG. 36 is displayed, and a send button 463B is displayed instead of the start button 463 on the scan execution screen 461. When the user presses the send button 463B, the image data generated by imaging is transmitted.

Figure 37:
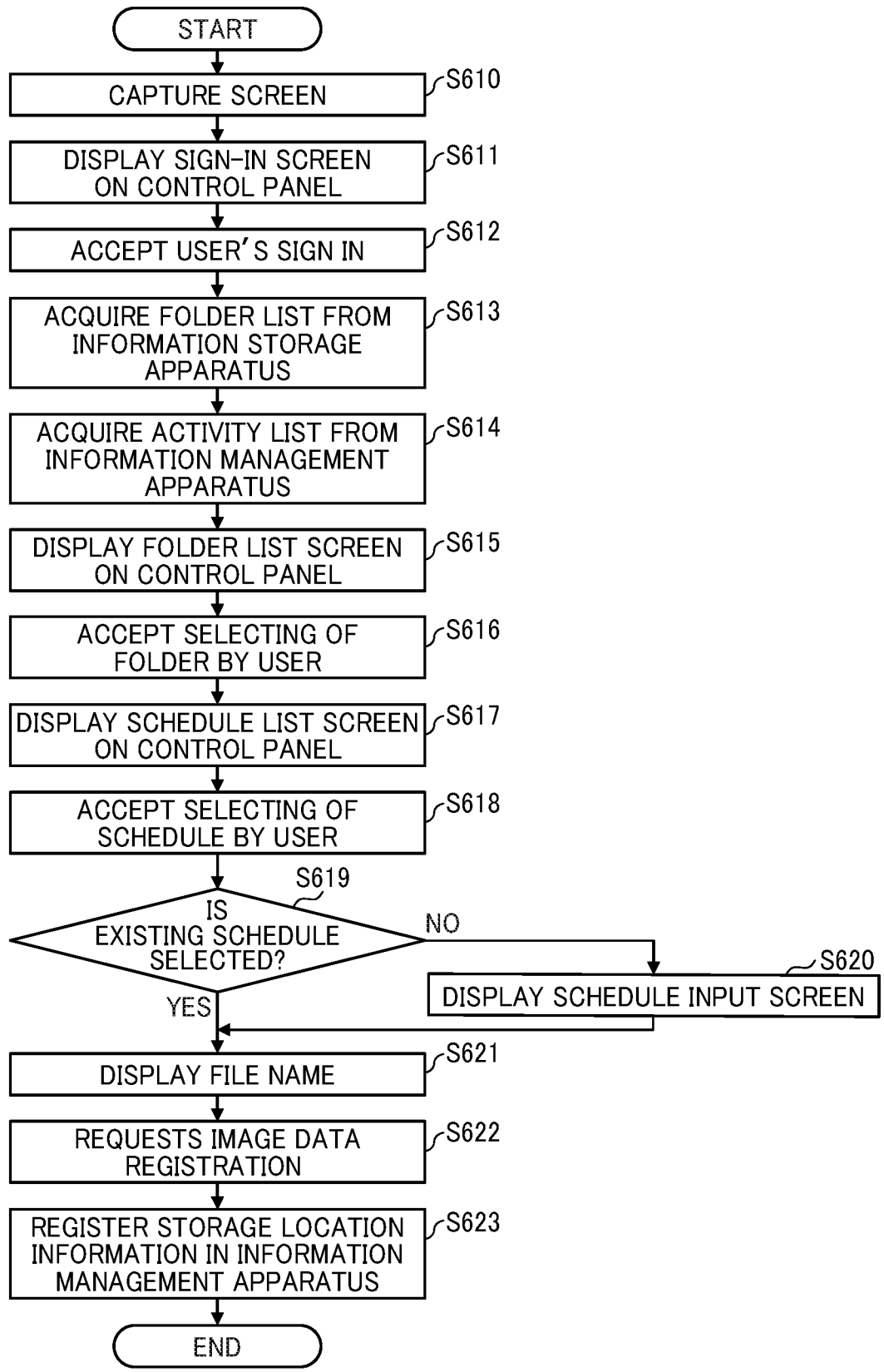
FIG. 37 is a flowchart of an example operation performed by the information processing apparatus as the information input equipment according to an embodiment.

FIG. 37 is a flowchart of an example operation performed by the information processing apparatus 70c as the information input equipment 70. The operation illustrated in FIG. 37 is different from the operation illustrated in FIG. 30 in that, at S610 in FIG. 37, the information processing apparatus 70c takes a picture of the whiteboard or the like to generate image data by imaging. The step at S422 in FIG. 30 is eliminated. Other operations can be similar to those of the MFP 70*a*. That is, operation from S611 to S621 and operation from S622 to S623 are similar to that from S411 to S421 and S423 to S424 illustrated in FIG. 30.

As described above, even when the electronic whiteboard 70*b* is used as the information input equipment 70, the image data can be managed in association with the schedule.

Further, the information input equipment 70 can be any equipment as long as the application program operates to acquire images. Therefore, examples of the information input equipment 70 is not limited to the MFP 70*a*, the electronic whiteboard 70*b* and the information processing apparatus 70*c*. For example, when a projector includes an imaging device, the imaging device takes a picture of the image projected by the projector to generate image data. For example, a remote conference device (teleconference terminal) located at another site also includes a function of imaging and registering the image data in the information storage apparatus 30.

Variations of Sequence Charts

Figure 38:
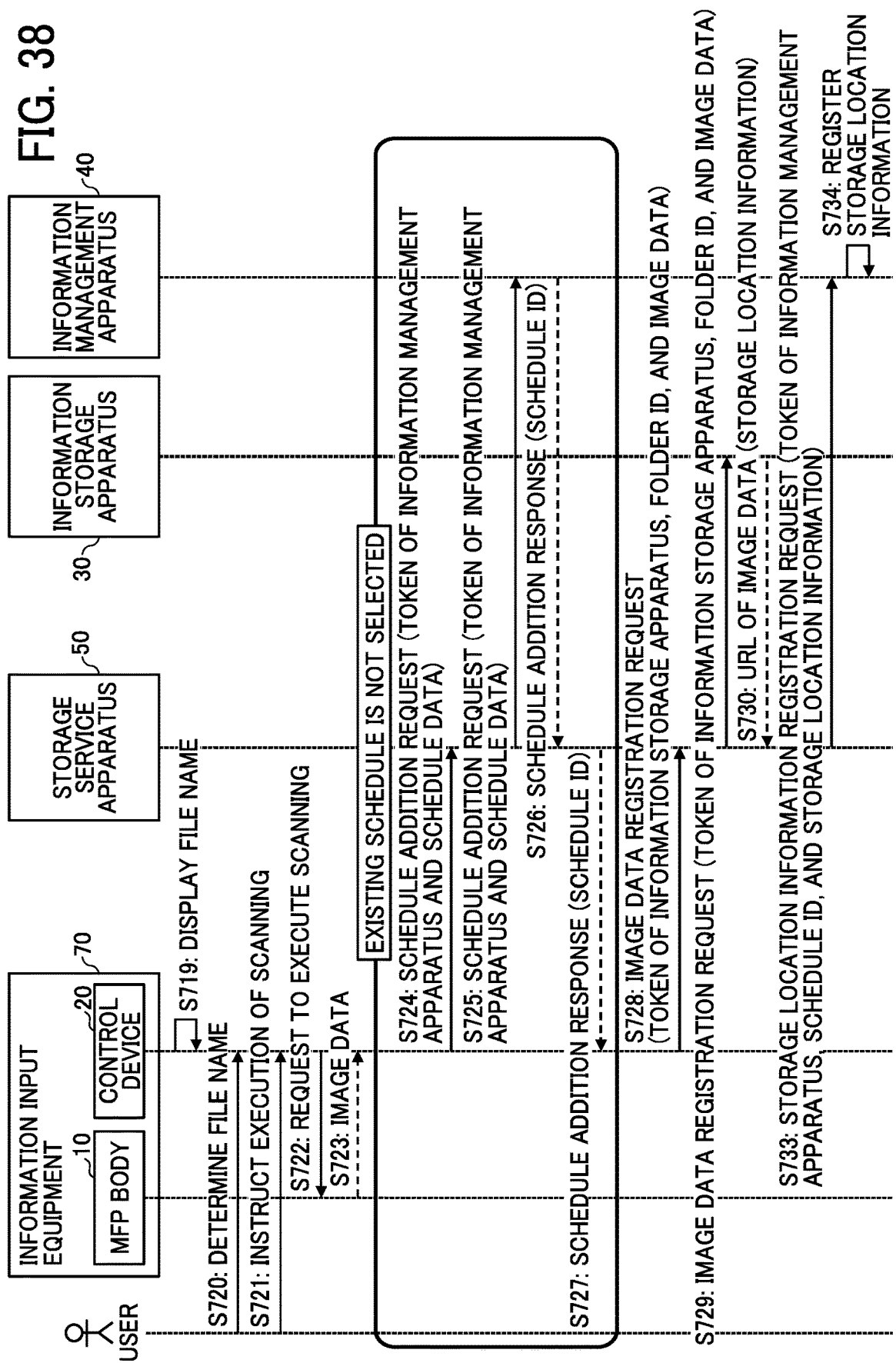
FIG. 38 is a sequence chart illustrating an example procedure performed by the information processing system to register image data according to a variation.

FIG. 38 is sequence chart illustrating an example procedure performed by the information processing system 100 to register image data. FIG. 38 illustrates a variation from the example illustrated in FIG. 24. In FIG. 38, the storage service apparatus 50 transmits the storage location information to the information management apparatus 40 without returning the storage location information to the information input equipment 70. Therefore, steps S31 and S32 in FIG. 24 are obviated. The differences will be described below.

At S730, the data registration request unit 78 of the information input equipment 70 transmits an image data registration request together with the token of the information storage apparatus 30, the folder ID, and the image data, to the storage service apparatus 50. At this time, the token of the information management apparatus 40 and the schedule ID are also transmitted.

At S733, the communication unit 53 of the storage service apparatus 50 receives the storage location information registration request 509. The communication unit 54 transmits the storage location information registration request to the information management apparatus 40, using the token of the information management apparatus 40 and the schedule ID received at S730. The operations from S719 to S729 and S734 are similar to those at the corresponding steps in FIG. 24.

According to the operation illustrated in FIG. 38, since the process at S31 and S32 are omitted, the time for registering the storage location information is reduced.

As described above, the information processing system 100 according to the present embodiment registers image data relating to a schedule item in association with that schedule item. According, the user can grasp where the image data is saved, and work such as inputting information in the terminal device 60 can be reduced.

Embodiment 2

Embodiment 1 described above concerns a case where the information management apparatus 40 manages a schedule as one example. Similarly, when a task list is managed, the information processing system 100 can associate image data with the task list. The task list is called "to-do List" or "work" in some cases.

In the case of task management, at S9 in FIG. 23, the information input equipment 70 requests a list of tasks from the storage service apparatus 50. Further, on the screen illustrated in (c) of FIG. 11, tasks are displayed instead of the schedule. The tasks displayed at that time can be either tasks due on that date or tasks due on a date specified by the user. In addition, at S32 and S33 illustrated in FIG. 24, a task ID is transmitted instead of the schedule ID.

TABLE 6

| Token of Information Storage Apparatus | User Id of Information Storage Apparatus | Subject | Task ID | Deadline |
|---|---|---|---|---|
| HIJKLMN | testesttuser | Finish Invoice | aaabbbb | 4 days to deadline |
| | | Figure | bbbccc | 7 days to deadline |

Table 6 schematically illustrates information stored in the schedule DB 491. Items of the schedule DB 491 includes "Token of Information Management Apparatus", "Subject", "Task ID", and "Deadline". The item "Subject" represents the title of the task. The item "Task ID" is information for specifying or identifying a tack in the information management apparatus 40. The item "Deadline" represents the time (e.g., date) by when the task should be done, but the user can input optional texts. In the present embodiment, the storage location information is registered at "Deadline".

Figure 39:
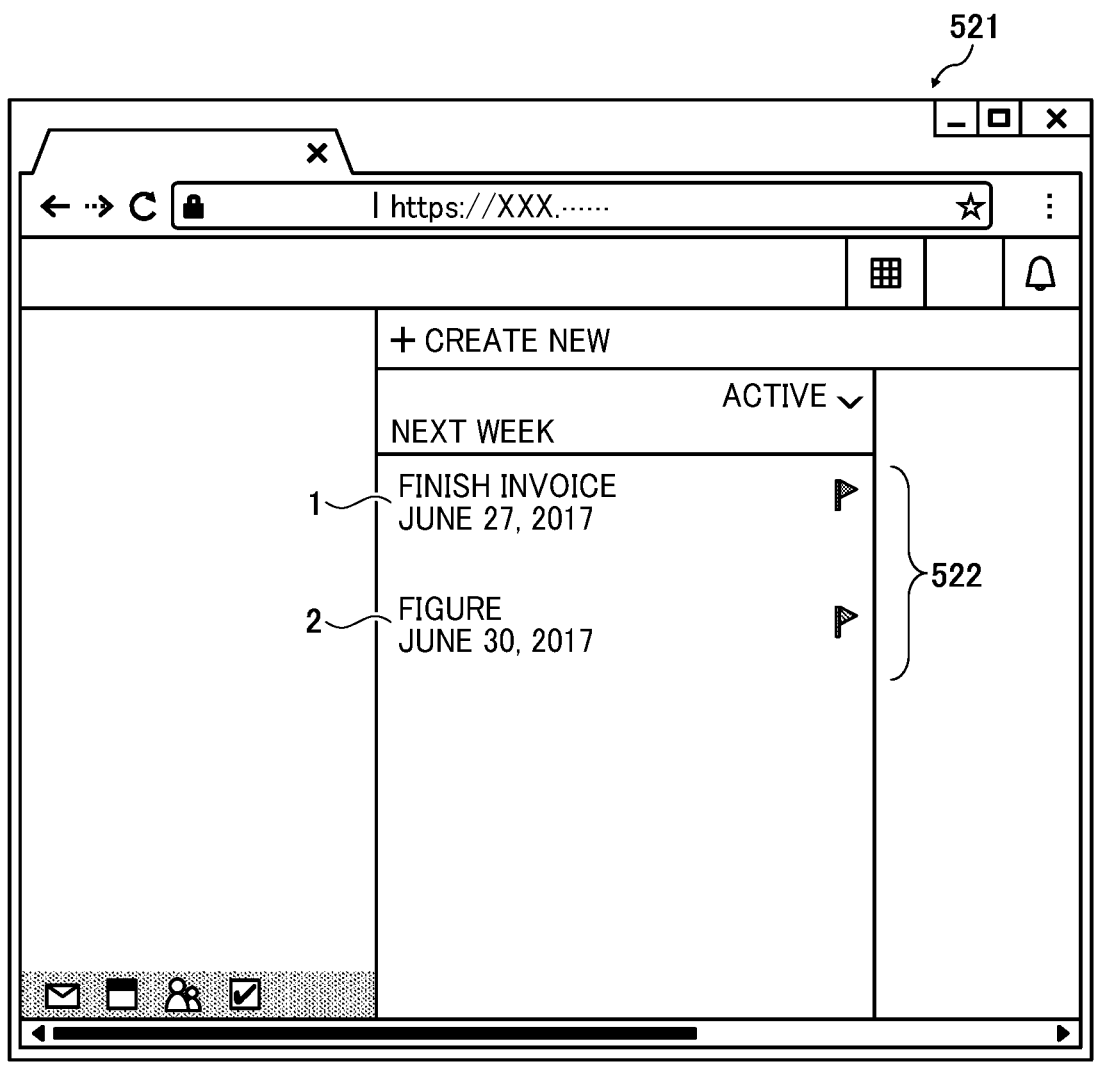
FIG. 39 illustrates an example task list screen on the terminal device communicating with the information management apparatus, according to an embodiment.

FIG. 39 illustrates a task list screen 521 on the terminal device 60 communicating with the information management apparatus 40. Depending on the destination to which the terminal device 60 has accessed, the terminal device 60 displays either the schedule screen or the task list screen.

The task list screen 521 includes a task list field 522. One or more task fields (task fields 1 and 2 in FIG. 39) are displayed in the task list field 522. As the user clicks (or taps) the task field 1 assigned with "Finish Invoice", the terminal device 60 accepts the operation and requests the information management apparatus 40 for details of the selected task field 1. As a result, a task detail screen 531 illustrated in FIG. 40 is displayed.

Figure 40:
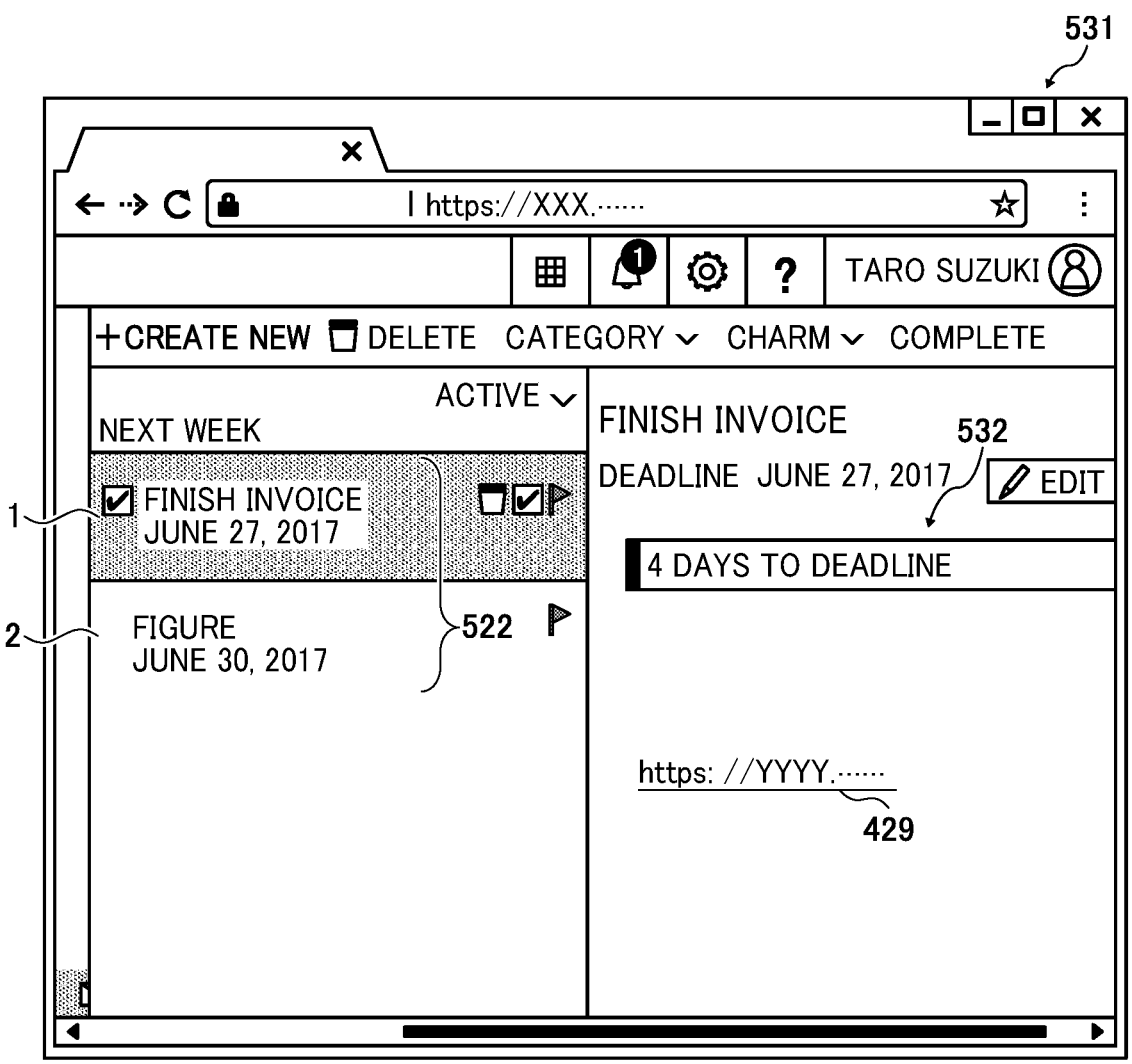
FIG. 40 illustrates an example task detail screen on the terminal device, according to an embodiment.

FIG. 40 illustrates an example of the task detail screen 531 displayed on the terminal device 60. On the task detail screen 531, a deadline field 532 for the tack field 1 is displayed while the task list field 522 is displayed. The number of days indicated in the deadline field 532 ("4 Days to Deadline" in FIG. 40) is based on the value preset by the user. In the case of the task list, the storage location information 429 is displayed in the deadline field 532. Thus, the storage location information can be registered also in association with the task list.

Figure 41:
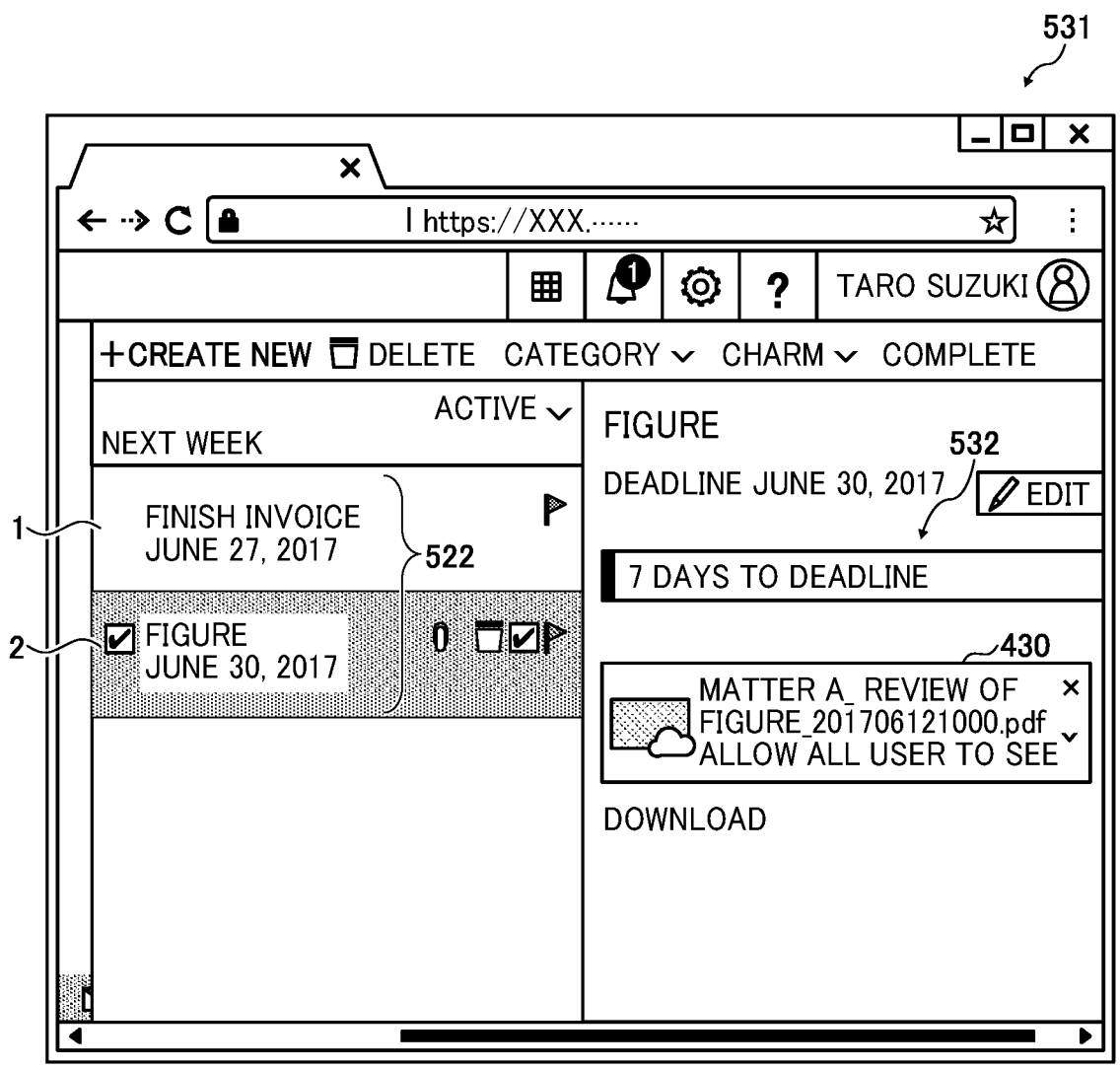
FIG. 41 illustrates an example task detail screen on the terminal device when storage location information is registered in the information management apparatus as a referred attachment, according to an embodiment.

Also in the case of task list, referred attachment is available to register the storage location information in association with the task list. FIG. 41 illustrates one example of the task detail screen 531 on the terminal device 60 when the storage location information is registered in the information management apparatus 40 as a referred attachment. In FIG. 41, the referred attachment field 430 is displayed in the deadline field 532. The manner of the referred attachment field 430 is similar to that in FIG. 31, and the file name of the image data is displayed. The storage location information is linked to the referred attachment field 430. Therefore, as the user operates the terminal device 60 and presses the referred attachment field 430, the user can view the image data stored in the information storage apparatus 30.

As described above, in the information processing system 100 according to the present embodiment, the image data relating to the task is registered in association with the task.

According, the user can grasp where the image data is saved, and work such as inputting information in the terminal device 60 can be reduced.

The present disclosure is not limited to the details of the embodiments described above, and various modifications and improvements are possible.

For example, in Embodiment 1 described above, the user designates a folder name, but the folder name can be called a directory name. Further, in a configuration in which the information storage apparatus 30 does not mange image data in discrete folders or directories, the system can obviate designation of folder name or directory name by the user.

In the present embodiment, the information input equipment 70 communicates with the information storage apparatus 30 and the information management apparatus 40 via the storage service apparatus 50. Alternatively, the information input equipment 70 can directly communicate with the information storage apparatus 30 and the information management apparatus 40. In this case, the user signs in each of the information storage apparatus 30 and the information management apparatus 40.

Further, in Embodiment 1, one piece of image data is associated with one schedule item, but a plurality of image data can be associated with one schedule item. By contrast, same image data can be associated with a plurality of schedule items.

In the example configuration illustrated, for example, in FIG. 6 of the above-described embodiments, functional blocks are divided based on main functions for ease of understanding of the information processing system 100. However, the present invention is not limited by such manner of dividing of processing units or the names thereof. The information processing system 100 can be divided into more detailed processing units according to contents of processing. In addition, a single processing unit can be further divided into a plurality of processing units.

The information storage apparatus 30 is an example of information storage service, and the information management apparatus 40 is an example of information display service. Tokens are examples of request information, and the storage service apparatus 50 is an example of information processing apparatus. The image data generator 72 is an example of generation unit, and the authentication request unit 77 is an example of acquisition unit. The first communication unit 75 is an example of first request unit, and the second communication unit 76 is an example of second request unit. The operation accepting unit 73 is an example of an accepting unit, and the schedule generator 80 is an example of schedule generation unit. The token of the storage service apparatus 50 is an example of user communication request information (second request information), and the information input equipment 70 is an example of information input apparatus.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an ASIC (Application Specific Integrated Circuit), DSP (Digital Signal Processor), FPGA (Field Programmable Gate Array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An information input apparatus communicable via a network with an information processing apparatus that manages request information for requesting processing from an information storage service and an information display service, the information input apparatus comprising circuitry configured to:
   generate data;
   acquire the request information from the information processing apparatus based on authentication of user, the request information corresponding to the authenticated user, the request information for instructing the information storage service and the information display service via the network, the information processing apparatus being different from the information input apparatus, the information storage service and the information display service provided by one or more apparatus being different from the information input apparatus and the information processing apparatus;
   request the information storage service to store the data, based on the request information acquired from the information processing apparatus;
   request the information display service to acquire a schedule list, based on the request information acquired from the information processing apparatus,
   accept an input of selection of an schedule item from the schedule list acquired from the information display service; and
   request, based on the request information acquired from the information processing apparatus, registration of information regarding the data stored by the information storage service in association with the schedule item selected at the information input apparatus, for display of the information related to the schedule item by the information display service.

2. The information input apparatus according to claim 1, wherein the request for display is for the information display service to acquire the data from the information storage service and display the data on a terminal device that communicates with the information display service via the network.

3. The information input apparatus according to claim 1, wherein the circuitry is configured to:
   acquire storage location information from the information storage service, the storage location information indicating at least one storage destination of the information storage service; and
   issue a request for enabling the information display service to display registration of the data to a storage destination specified by the storage location information.

4. The information input apparatus according to claim 3, wherein the circuitry is configured to:
   accept an input, to the information input apparatus, of schedule information;
   generate a schedule item according to the schedule information and register the schedule item in the information display service; and
   request, either directly or via the information processing apparatus, the information display service to register the storage location information in association with the schedule information.

5. The information input apparatus according to claim 4, wherein the circuitry is configured to request the information display service to enable display of the storage location information together with the schedule information on a terminal device that communicates with the information display service.

6. The information input apparatus according to claim 4, wherein the circuitry is configured to request the information display service to enable display of a file name of the data together with the schedule information on a terminal device that communicates with the information display service.

7. The information input apparatus according to claim 1, wherein the circuitry is configured to:
    acquire storage location information from the information storage service, the storage location information indicating at least one storage destination of the information storage service,
    issue a request for enabling the information display service to display registration of the data to a storage destination specified by the storage location information,
    accept an input, to the information input apparatus, of schedule information regarding a scheduled event on a calendar that includes a specified start time and end time,
    generate a schedule item according to the schedule information and register the schedule item in the information display service, and
    request, either directly or via the information processing apparatus, the information display service to register the storage location information in association with the schedule information.

8. An information processing system comprising:
    an information processing apparatus configured to manage request information for requesting processing from an information storage service and an information display service; and
    an information input apparatus connected via a network to the information processing apparatus,
    the information processing system including circuitry configured to:
    generate data;
    acquire the request information from the information processing apparatus based on authentication of user, the request information corresponding to the authenticated user, the request information for instructing the information storage service and the information display service via the network, the information processing apparatus being different from the information input apparatus, the information storage service and the information display service provided by one or more apparatus being different from the information input apparatus and the information processing apparatus;
    request the information storage service to store the data, based on the request information acquired from the information processing apparatus;
    request the information display service to acquire a schedule list, based on the request information acquired from the information processing apparatus;
    accept an input of selection of an schedule item from the schedule list acquired from the information display service; and
    request, based on the request information acquired from the information processing apparatus, registration of information regarding the data stored by the information storage service in association with the schedule item selected at the information input apparatus, for display of the information related to the schedule item by the information display service.

9. The information processing system according to claim 8,
    wherein the information processing apparatus is configured to store, in association with user identification information, the request information for communicating with the information storage service and the information display service,
    wherein the information processing apparatus is configured to transmit the request information to the information input apparatus in response to a user's sign-in to the information processing apparatus,
    wherein the circuitry of the information input apparatus is configured to:
        specify the request information to communicate with the information storage service via the information processing apparatus; and
        specify the request information to communicate with the information display service via the information processing apparatus.

10. The information processing system according to claim 8,
    wherein the information processing apparatus is configured to store, in association with user identification information, the request information for communicating with the information storage service and the information display service,
    wherein the information processing apparatus is configured to transmit the request information to the information input apparatus in response to a user's sign-in to the information processing apparatus,
    wherein the circuitry of the information input apparatus is configured to:
        specify the request information to communicate with the information storage service without communicating with the information processing apparatus, and
        specify the request information to communicate with the information display service without communicating with the information processing apparatus.

11. The information processing system according to claim 8,
    wherein the information processing apparatus is configured to store, in association with user identification information:
        the request information for communicating with the information storage service and the information display service; and
        user communication request information for permitting a user to communicate with the information processing apparatus,
    wherein the information processing apparatus is configured to transmit the user communication request information to the information input apparatus in response to a user's sign-in to the information processing apparatus,
    wherein the circuitry of the information input apparatus is configured to:
        specify the user communication request information and transmit, to the information processing apparatus, a request of processing from the information storage service;
        communicate with the information storage service using the request information associated with the user communication request information acquired by the information processing apparatus;

specify the user communication request information and transmit, to the information processing apparatus, a request of processing from the information display service; and communicate with the information display service using the request information associated with the user communication request information acquired by the information processing apparatus.

12. An information processing method performed by an information input apparatus connected via a network to an information processing apparatus that manages request information for requesting processing from an information storage service and an information display service, the method comprising:

generating data;

acquiring the request information from the information processing apparatus based on authentication of user, the request information corresponding to the authenticated user, the request information for instructing the information storage service and the information display service via the network, the information processing apparatus being different from the information input apparatus, the information storage service and the information display service provided by one or more apparatus being different from the information input apparatus and the information processing apparatus;

requesting the information storage service to store the data based on the request information acquired from the information processing apparatus;

requesting the information display service to acquire a schedule list, based on the request information acquired from the information processing apparatus;

accepting an input of selection of an schedule item from the schedule list acquired from the information display service; and requesting, based on the request information acquired from the information processing apparatus, registration of information regarding the data stored by the information storage service in association with the schedule item selected at the information input apparatus, for display of the information related to the schedule item by the information display service.

* * * * *